United States Patent
Xu

(10) Patent No.: US 12,355,630 B2
(45) Date of Patent: Jul. 8, 2025

(54) METHOD AND APPARATUS FOR DATA COLLECTION IN COMMUNICATION NETWORK

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 20 days.

(21) Appl. No.: 17/851,825

(22) Filed: Jun. 28, 2022

(65) Prior Publication Data

US 2022/0329492 A1 Oct. 13, 2022

Related U.S. Application Data

(63) Continuation of application No. PCT/CN2020/108258, filed on Aug. 10, 2020.

(51) Int. Cl.
*H04L 41/14* (2022.01)

(52) U.S. Cl.
CPC .................... *H04L 41/14* (2013.01)

(58) Field of Classification Search
CPC ....... H04L 41/14; H04L 43/065; H04L 43/12; H04L 63/101; H04L 63/102; H04L 63/105; H04W 12/06; H04W 12/068
See application file for complete search history.

(56) References Cited

U.S. PATENT DOCUMENTS 10,587,531 B2 * 3/2020 Li ............................ H04L 47/80
11,063,981 B2 * 7/2021 Salmela .................. H04W 4/06
(Continued)

FOREIGN PATENT DOCUMENTS

| CN | 106227705 A | 12/2016 |
| CN | 109842906 A | 6/2019 |

(Continued)

OTHER PUBLICATIONS

3GPP TR 29.890 V1.0.1 (Sep. 2017) ; 3rd Generation Partnership Project; Technical Specification Group Core Network and Terminals; Study on CT WG3 Aspects of 5G System-Phase 1; Stage 3 (Release 15).

(Continued)

*Primary Examiner* — Schquita D Goodwin
(74) *Attorney, Agent, or Firm* — Ladas & Parry LLP

(57) ABSTRACT

The present application provides data collection methods and apparatuses. A method is applied to a data collection network element, where the method includes: receiving a data obtaining request sent by a data usage network element, wherein the data obtaining request is used to request the data collection network element to provide data to the data usage network element; performing authorization verification on the data obtaining request sent by the data usage network element to obtain a result of the authorization verification; determining whether to send the data to the data usage network element, and/or, determining a content of the data to be sent to the data usage network element, according to the result of the authorization verification. Compared with the prior art, the authorization verification will be performed on the data obtaining request sent by the data usage network element when providing data, thus it can be ensured that only an authorized data usage network element can obtain data, thereby data security can be improved.

13 Claims, 11 Drawing Sheets

(56) References Cited

U.S. PATENT DOCUMENTS

| | | | |
|---|---|---|---|
| 2015/0215834 A1 | 7/2015 | Qi et al. | |
| 2019/0356558 A1* | 11/2019 | Han | H04L 41/5009 |
| 2020/0228420 A1 | 7/2020 | Dao et al. | |
| 2020/0252813 A1* | 8/2020 | Li | H04W 24/08 |
| 2020/0358689 A1* | 11/2020 | Lee | H04L 43/028 |
| 2022/0312158 A1* | 9/2022 | Gonzalez | H04W 28/0284 |
| 2022/0369170 A1* | 11/2022 | Roeland | H04W 36/32 |
| 2023/0037802 A1* | 2/2023 | Karampatsis | H04L 43/06 |
| 2023/0117382 A1* | 4/2023 | Zhang | H04L 41/14 709/224 |
| 2023/0180038 A1* | 6/2023 | Chen | H04L 41/14 370/252 |
| 2023/0319533 A1* | 10/2023 | Ly | H04L 43/04 709/224 |

FOREIGN PATENT DOCUMENTS

| | | | | |
|---|---|---|---|---|
| CN | 110536411 A | 12/2019 | | |
| CN | 110798360 A | 2/2020 | | |
| CN | 110831038 A | 2/2020 | | |
| CN | 110868712 A | 3/2020 | | |
| WO | WO-2015180427 A1 * | 12/2015 | | H04L 29/06 |
| WO | 2019184433 A1 | 10/2019 | | |
| WO | 2019243874 A1 | 12/2019 | | |
| WO | 2020066890 A1 | 4/2020 | | |

OTHER PUBLICATIONS

The EESR of corresponding European application No. 20948949.1, dated Feb. 8, 2023.

International Search Report (ISR) dated May 10, 2021 for Application No. PCT/CN2020/108258.

Written Opinion (WOSA) dated May 10, 2021 for Application No. PCT/CN2020/108258.

3GPP 3rd Generation Partnership Project;Technical Specification Group Services and System Aspects;Architecture enhancements for 5G System (5GS) to support network data analytics services (Release 16) 3GPP TS 23.288 V0.4.0 Apr. 30, 2019.

Motorola Mobility, Lenovo:'Solution for Key Issue 16—Selecting an Edge Application Server based on NWDAF analytics' 3GPP TSG-SA WG2 Meeting #139e S2-2004562 Jun. 12, 2020.

3GPP 3rd Generation Partnership Project; Technical Specification Group Services and System Aspects;5G Media Streaming (5GMS);General description and architecture (Release 16) 3GPP TS 26.501 V16.2.0 Dec. 2019.

Ericsson:'KI #8, New Sol: Providing UE Analytics to the NWDAF via the User Plane' SA WG2 Meeting #139-e S2-2003695 Jun. 12, 2020.

Samsung, Updates to UE driven analytics solution 16, S2-1811164, SA WG2 Meeting #129, Aug. 20-24, 2018, Dongguan, P.R. China.

The first Office Action of corresponding Chinese application No. 202211017707.4, dated Jul. 27, 2023.

The second Office Action of corresponding Chinese application No. 202211017707.4, dated Oct. 10, 2023.

The Notice of Rejection of corresponding Chinese application No. 202211017707.4, dated Jan. 4, 2024.

The first Office Action of corresponding European application No. 20948949.1, dated Nov. 15, 2023.

3rd Generation Partnership Project, Technical Specification Group, Services and System Aspects, Study of Enablers for Network Automation for 5G (Release 16); 3GPP Standard; Technical Report; 3GPP TR 23.791; 3rd Generation Partnership Project (3GPP); Sep. 6, 2018 (Sep. 6, 2018); pp. 1-66; XP051475227; [retrieved on Sep. 6, 2018].

The third Office Action of corresponding Chinese application No. 202211017707.4, dated May 27, 2024.

The second Office Action of corresponding European application No. 20948949.1, dated May 21, 2024.

The third Office Action of corresponding European application No. 20948949.1, dated Jan. 10, 2025.

* cited by examiner

METHOD AND APPARATUS FOR DATA COLLECTION IN COMMUNICATION NETWORK

CROSS-REFERENCE TO RELATED APPLICATIONS

The present application is a continuation of International Application No. PCT/CN2020/108258, filed on Aug. 10, 2020, entitled "DATA COLLECTION METHOD AND APPARATUS", the content of which is incorporated herein by reference in its entirety.

TECHNICAL FIELD

The present application relates to the field of communication technology, and in particular, to a data collection method and apparatus.

BACKGROUND

With the development of communication technology, a network data analysis function (NWDAF) network element is added to a core network of a 5G network. The NWDAF can collect data from various network elements, network management systems and the like of the core network, and conduct big data statistics and analysis to obtain analysis data or prediction data on a network side. The analysis data or prediction data on the network side can assist various network elements to control an access of a terminal device to the network more effectively.

In the prior art, an interface is defined between an NWDAF and a network function network element, and the NWDAF can obtain data from the network side network element through the interface, and send an analysis result of the data to the network side network element. The network side network element may also request the NWDAF for the analysis result for a certain piece of data.

However, in the existing data collection method for the NWDAF, the network side network element opens all data to the NWDAF, thereby reducing data security greatly.

SUMMARY

Embodiments of the present application provide a data collection method and apparatus to solve the problem of low data security in the prior art.

A first aspect of the present application provides a data collection method applied to a data collection network element, and the method includes: receiving a data obtaining request sent by a data usage network element, where the data obtaining request is used to request the data collection network element to provide data to the data usage network element; performing authorization verification on the data obtaining request sent by the data usage network element to obtain a result of the authorization verification; and determining whether to send the data to the data usage network element, and/or, determining a content of the data to be sent to the data usage network element, according to the result of the authorization verification.

In an optional implementation, the performing authorization verification on the data obtaining request sent by the data usage network element to obtain the result of the authorization verification includes: performing authorization verification on the data obtaining request sent by the data usage network element according to a data domain to which the data usage network element belongs to obtain the result of the authorization verification.

In an optional implementation, the data obtaining request includes an identifier of the data usage network element and/or an identifier of the data domain to which the data usage network element belongs.

In an optional implementation, before the performing authorization verification on the data obtaining request sent by the data usage network element, the method further includes: determining the data domain to which the data usage network element belongs according to the identifier of the data usage network element and a corresponding relationship between the data usage network element and the data domain.

In an optional implementation, before the performing authorization verification on the data obtaining request sent by the data usage network element, the method further includes: sending a query request to a network function network element, where the query request is used to query the data domain to which the data usage network element belongs, and the query request includes the identifier of the data usage network element; and receiving feedback information sent by the network function network element, where the feedback information includes the identifier of the data domain to which the data usage network element belongs.

In an optional implementation, the method further includes: determining the data domain to which the data usage network element belongs according to the identifier of the data domain to which the data usage network element belongs.

In an optional implementation, the determining a content of the data to be sent to the data usage network element includes: obtaining data of the data domain to which the data usage network element belongs from the data collection network element; and sending the data of the data domain to which the data usage network element belongs to the data usage network element.

In an optional implementation, the determining whether to send the data to the data usage network element includes: sending the data requested by the data usage network element to the data usage network element if a data domain where the data requested by the data usage network element is located is the same as a data domain to which the data usage network element belongs.

In an optional implementation, the determining whether to send the data to the data usage network element includes: forbidding sending the data requested by the data usage network element to the data usage network element, or, sending part of the data requested by the data usage network element to the data usage network element if a data domain where the data requested by the data usage network element is located is different from a data domain to which the data usage network element belongs.

In an optional implementation, the data collection network element includes source data and processed data corresponding to the source data; the source data is used for sending to a data usage network element consistent with a data domain of the source data, and the processed data is used for sending to a data usage network element inconsistent with the data domain of the source data.

In an optional implementation, the data domain is a network slice.

A second aspect of the present application provides a data collection method applied to a data usage network element, and the method includes: sending a data obtaining request to a data collection network element, where the data obtaining request is used to request the data collection network element to provide data to the data usage network element; receiving data in the data collection network element sent by the data collection network element, where the data in the data collection network element is related to authorization verification of the data usage network element; and performing data analysis using the data in the data collection network element.

In an optional implementation, the data obtaining request further includes an identifier of a data domain to which the data requested to be obtained belongs.

In an optional implementation, the authorization verification is related to a data domain to which the data collection network element belongs.

In an optional implementation, the data obtaining request includes an identifier of the data usage network element and/or an identifier of the data domain to which the data usage network element belongs.

In an optional implementation, the data domain is a network slice.

A third aspect of the present application provides a data collection method applied to a network function network element, and the method includes: receiving a data domain query request sent by a data collection network element, where the data domain query request includes an identifier of a data usage network element; determining a data domain to which the data usage network element belongs according to the identifier of the data usage network element; and sending feedback information to the data collection network element, where the feedback information includes an identifier of the data domain to which the data usage network element belongs.

In an optional implementation, the data domain is a network slice.

A fourth aspect of the present application provides a data collection method applied to a data collection network element, and the method includes: receiving terminal data sent by at least one application network element, where the terminal data is reported to the at least one application network element by a terminal device; and sending the terminal data to a data usage network element in an operator network.

In an optional implementation, after the receiving the terminal data sent by at least one application network element, the method further includes: processing the terminal data.

In an optional implementation, a manner of the processing include at least one of the following: collecting statistics about the terminal data reported by multiple terminal devices, determining an average of the terminal data reported by multiple terminal devices, removing a terminal device identifier in the terminal data, replacing a terminal device identifier in the terminal data, performing scrambling processing on the terminal data, and extracting and summarizing data from the corresponding terminal data reported by the multiple terminal devices.

In an optional implementation, before the receiving the terminal data sent by the at least one application network element, the method further includes: sending a data obtaining request to the at least one application network element, where the data obtaining request is used to request to obtain the terminal data in the at least one application network element.

In an optional implementation, the sending the data obtaining request to the at least one application network element includes: sending the data obtaining request to the application network element through an application program interface API of the application network element.

In an optional implementation, before the receiving the terminal data sent by the at least one application network element, the method further includes: receiving a data sending request sent by the application network element, where the data sending request is used to request to send the terminal data in the application network element to the data collection network element; and sending a data sending indication to the application network element.

In an optional implementation, the receiving the data sending request sent by the application network element includes: receiving the data sending request sent by the application network element through an API of the data collection network element.

In an optional implementation, before the receiving the terminal data sent by the at least one application network element, the method further includes: establishing a network connection between the data collection network element and the application network element through an API of the data collection network element and an API of the application network element.

In an optional implementation, the establishing the network connection between the data collection network element and the application network element includes: establishing a user plane network connection between the data collection network element and the application network element through a control plane connection between the API of the data collection network element and the API of the application network element.

In an optional implementation, the method further includes: receiving an indication parameter sent by the application network element, where the indication parameter is used to indicate the manner of the processing.

In an optional implementation, the method further includes: receiving an identifier of an application corresponding to the terminal data sent by the application network element.

In an optional implementation, the method further includes: receiving a number of terminals corresponding to the terminal data sent by the application network element.

In an optional implementation, the method further includes: receiving a batch sending identifier corresponding to the terminal data sent by the application network element, where the batch sending identifier is used to replace a terminal device identifier in the terminal data.

A fifth aspect of the present application provides a data collection method applied to a data usage network element, and the method includes: receiving terminal data sent by a data collection network element; and performing data analysis using the terminal data.

A sixth aspect of the present application provides a data collection method applied to an application network element, and the method includes: receiving terminal data reported by a terminal device; and sending the terminal data to a data collection network element.

A seventh aspect of the present application provides a data collection network element, and the data collection network element includes: a receiving module, configured to receive a data obtaining request sent by a data usage network element, where the data obtaining request is used to request the data collection network element to provide data to the data usage network element; a processing module, configured to perform authorization verification on the data obtaining request sent by the data usage network element to obtain a result of the authorization verification; and a sending module, configured to determine whether to send the data to the data usage network element, and/or, determining a content of the data to be sent to the data usage network element, according to the result of the authorization verification.

In an optional implementation, the processing module is specifically configured to perform authorization verification on the data obtaining request sent by the data usage network element according to a data domain to which the data usage network element belongs to obtain the result of the authorization verification.

In an optional implementation, the data obtaining request includes an identifier of the data usage network element and/or an identifier of the data domain to which the data usage network element belongs.

In an optional implementation, the processing module is further configured to determine the data domain to which the data usage network element belongs according to the identifier of the data usage network element and a corresponding relationship between the data usage network element and the data domain.

In an optional implementation, the processing module is further configured to send a query request to a network function network element, where the query request is used to query the data domain to which the data usage network element belongs, and the query request includes the identifier of the data usage network element; and receive feedback information sent by the network function network element, where the feedback information includes the identifier of the data domain to which the data usage network element belongs.

In an optional implementation, the processing module is further configured to determine the data domain to which the data usage network element belongs according to the identifier of the data domain to which the data usage network element belongs.

In an optional implementation, the sending module is specifically configured to obtain data of a data domain to which the data usage network element belongs from the data collection network element; and send the data of the data domain to which the data usage network element belongs to the data usage network element.

In an optional implementation, the sending module is specifically configured to send the data requested by the data usage network element to the data usage network element if a data domain where the data requested by the data usage network element is located is the same as a data domain to which the data usage network element belongs.

In an optional implementation, the sending module is specifically configured to forbid sending the data requested by the data usage network element to the data usage network element, or, send part of the data requested by the data usage network element to the data usage network element, if a data domain where the data requested by the data usage network element is located is different from a data domain to which the data usage network element belongs.

In an optional implementation, the data collection network element includes source data and processed data corresponding to the source data; the source data is used for sending to a data usage network element consistent with a data domain of the source data, and the processed data is used for sending to a data usage network element inconsistent with the data domain of the source data.

In an optional implementation, the data domain is a network slice.

An eighth aspect of the present application provides a data usage network element, where the data usage network element includes: a sending module, configured to send a data obtaining request to a data collection network element, where the data obtaining request is used to request the data collection network element to provide data to the data usage network element; a receiving module, configured to receive data in the data collection network element sent by the data collection network element, where the data in the data collection network element is related to authorization verification of the data usage network element; and a processing module, configured to perform data analysis using the data in the data collection network element.

In an optional implementation, the data obtaining request further includes an identifier of a data domain to which the data requested to be obtained belongs.

In an optional implementation, the authorization verification is related to the data domain to which the data collection network element belongs.

In an optional implementation, the data obtaining request includes an identifier of the data usage network element and/or an identifier of the data domain to which the data usage network element belongs.

In an optional implementation, the data domain is a network slice.

A ninth aspect of the present application provides a network function network element, where the network function network element includes: a receiving module, configured to receive a data domain query request sent by a data collection network element, where the data domain query request includes an identifier of the data usage network element; a processing module, configured to determine a data domain to which the data usage network element belongs according to the identifier of the data usage network element; and a sending module, configured to send feedback information to the data collection network element, where the feedback information includes an identifier of the data domain to which the data usage network element belongs.

In an optional implementation, the data domain is a network slice.

A tenth aspect of the present application provides a data collection network element, where the data collection network element includes: a receiving module, configured to receive terminal data sent by at least one application network element, where the terminal data is reported to the at least one application network element by a terminal device; and a sending module, configured to send the terminal data to a data usage network element in an operator network.

In an optional implementation, the data collection network element further includes: a processing module, configured to process the terminal data.

In an optional implementation, a manner of the processing includes at least one of the following: collecting statistics about the terminal data reported by multiple terminal devices, determining an average of the terminal data reported by multiple terminal devices, removing a terminal device identifier in the terminal data, replacing a terminal device identifier in the terminal data, performing scrambling processing on the terminal data, and extracting and summarizing data from the corresponding terminal data reported by the multiple terminal devices.

In an optional implementation, the sending module is further configured to send a data obtaining request to the at least one application network element, where the data obtaining request is used to request to obtain the terminal data in the at least one application network element.

In an optional implementation, the sending module is specifically configured to send the data obtaining request to the application network element through an application program interface API of the application network element.

In an optional implementation, the receiving module is further configured to receive a data sending request sent by the application network element, where the data sending request is used to request to send the terminal data in the application network element to the data collection network element; and the sending module is further configured to send a data sending indication to the application network element.

In an optional implementation, the receiving module is specifically configured to receive the data sending request sent by the application network element through an API of the data collection network element.

In an optional implementation, the processing module is further configured to establish a network connection between the data collection network element and the application network element through an API of the data collection network element and an API of the application network element.

In an optional implementation, the processing module is specifically configured to establish a user plane network connection between the data collection network element and the application network element through a control plane connection between the API of the data collection network element and the API of the application network element.

In an optional implementation, the receiving module is further configured to receive an indication parameter sent by the application network element, where the indication parameter is used to indicate the manner of the processing.

In an optional implementation, the receiving module is further configured to receive an identifier of an application corresponding to the terminal data sent by the application network element.

In an optional implementation, the receiving module is further configured to receive a number of terminals corresponding to the terminal data sent by the application network element.

In an optional implementation, the receiving module is further configured to receive a batch sending identifier corresponding to the terminal data sent by the application network elements, where the batch sending identifier is used to replace a terminal device identifier in the terminal data.

An eleventh aspect of the present application provides a data usage network element, where the data usage network element includes: a receiving module, configured to receive terminal data sent by a data collection network element; and a processing module, configured to perform data analysis using the terminal data.

A twelfth aspect of the present application provides an application network element, where the application network element includes: a receiving module, configured to receive terminal data reported by a terminal device; and a sending module, configured to send the terminal data to a data collection network element.

A thirteenth aspect of the present application provides a data collection network element, including: a processor, a memory, a transmitter and a receiver; the memory is configured to store a computer program, and the processor is configured to call and run the computer program stored in the memory to execute the method according to the first aspect or the fourth aspect; and the transmitter is configured to perform sending actions, and the receiver is configured to perform receiving actions.

A fourteenth aspect of the present application provides a data usage network element, including: a processor, a memory, a transmitter and a receiver; the memory is configured to store a computer program, and the processor is configured to call and run the computer program stored in the memory to execute the method according to the second aspect or the fifth aspect; and the transmitter is configured to perform sending actions, and the receiver is configured to perform receiving actions.

A fifteenth aspect of the present application provides a network function network element, including: a processor, a memory, a transmitter and a receiver; the memory is configured to store a computer program, and the processor is configured to call and run the computer program stored in the memory to execute the method according to the third aspect; and the transmitter is configured to perform sending actions, and the receiver is configured to perform receiving actions.

A sixteenth aspect of the present application provides an application network element, including: a processor, a memory, a transmitter and a receiver; the memory is configured to store a computer program, and the processor is configured to call and run the computer program stored in the memory to execute the method according to the sixth aspect; and the transmitter is configured to perform sending actions, and the receiver is configured to perform receiving actions.

A seventeenth aspect of the present application provides a chip including a processor configured to call and run a computer program from a memory, so as to cause a device equipped with the chip to execute the method according to anyone of the first aspect to the sixth aspect.

An eighteenth aspect of the present application provides a computer readable storage medium for storing a computer program that causes a computer to execute the method according to anyone of the first aspect to the sixth aspect.

A nineteenth aspect of the present application provides a computer program product includes computer program instructions that cause a computer to execute the method according to anyone of the first aspect to the sixth aspect.

A twentieth aspect of the present application provides a computer program that causes a computer to execute the method according to anyone of the first aspect to the sixth aspect.

In the data collection methods and apparatuses provided by the embodiments of the present application, the data collection network element receives a data obtaining request sent by the data usage network element, where the data obtaining request is used to request the data collection network element to provide data to the data usage network element. Subsequently, the data collection network element performs authorization verification on the data obtaining request sent by the data usage network element, and obtains a result of the authorization verification. Finally, the data collection network element determines whether to send the data to the data usage network element, and/or determines a content of the data to be sent to the data usage network element, according to the result of the authorization verification. Compared with the prior art, the authorization verification will be performed on the data obtaining request sent by the data usage network element when providing data, then it can be ensured that only an authorized data usage network element can obtain specific data, and thus data security can be improved.

BRIEF DESCRIPTION OF THE DRAWINGS

In order to more clearly explain the technical solutions of the present disclosure or in the prior art, the following will briefly introduce the drawings that need to be used in the description of the embodiments or the prior art. Obviously, the drawings in the following description are some embodiments of the present disclosure, and for those or ordinary skill in the art, other drawings can be obtained according to these drawings without paying creative effort.

DESCRIPTION OF EMBODIMENTS

In order to make the purpose, technical solutions and advantages of the present disclosure clearer, the technical solutions in the embodiments of the present disclosure will be clearly and completely described below with reference to the drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative effort belong to the protection scope of the present disclosure.

First, system architecture of a terminal device accessing a mobile network is described. In existing system architecture of a mobile network, a terminal device and a network device perform access stratum (AS) connection, so as to exchange access stratum messages and perform wireless data transmission. The terminal device performs non access stratum (NAS) connection with an access management function (AMF) network element, and exchanges NAS messages. The AMF is responsible for mobility management of the terminal device, and a session management function (SMF) network element is responsible for session management of the terminal device. In addition, the AMF is also responsible for forwarding messages related to session management between the terminal device and the SMF besides performing the mobility management of the terminal device. A policy control function (PCF) network element is responsible for formulating policies related to mobility management, session management, charging of the terminal device, and the like. A user plane function (UPF) network element is connected with a network device and an external data network for data transmission.

Figure 1:
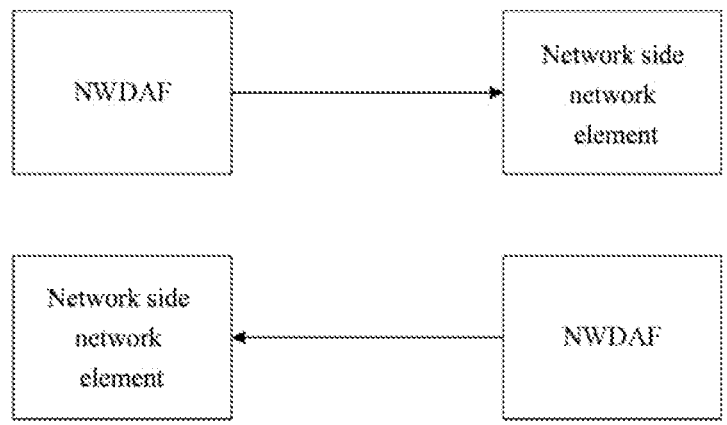
FIG. 1 is a schematic diagram of interaction between an existing NWDAF and other network side network elements.

With the development of communication technology, a network data analysis function (NWDAF) network element is added to a core network of a 5G network. The data usage network element can collect data from various network elements, network management systems and the like of the core network, and conduct big data statistics and analysis to obtain analysis data or prediction data on the network side. The analysis data or prediction data on the network side can assist various network elements to control an access of a terminal device to the network more effectively. FIG. 1 is a schematic diagram of interaction between an existing NWDAF and other network side network elements. As shown in FIG. 1, an interface is defined between the NWDAF and the network function (NF) network element, and the NWDAF can obtain data from the network side network element through the interface, and send an analysis result of the data to the network side network element. The network side network element may also request the NWDAF for the analysis result for a certain piece of data. However, in the current data collection method, the network side network element opens all data to the NWDAF, thereby reducing data security greatly.

In order to solve the above problem, the present application provides a data collection method and apparatus to solve the problem of low data security in the prior art. The inventive concept of the present application is to set different authorizations for different data usage network elements, and only data corresponding to the authorization can be obtained. At this time, when the data usage network element requests the data collection network element to obtain data, the authorization verification may be performed on the data obtaining request sent by the data usage network element, so as to determine whether to send the data to the data usage network element, and/or, determine a content of the data to be sent to the data usage network element. Compared with the prior art, data security can be improved.

Application scenarios of the present application are described below.

Figure 2:
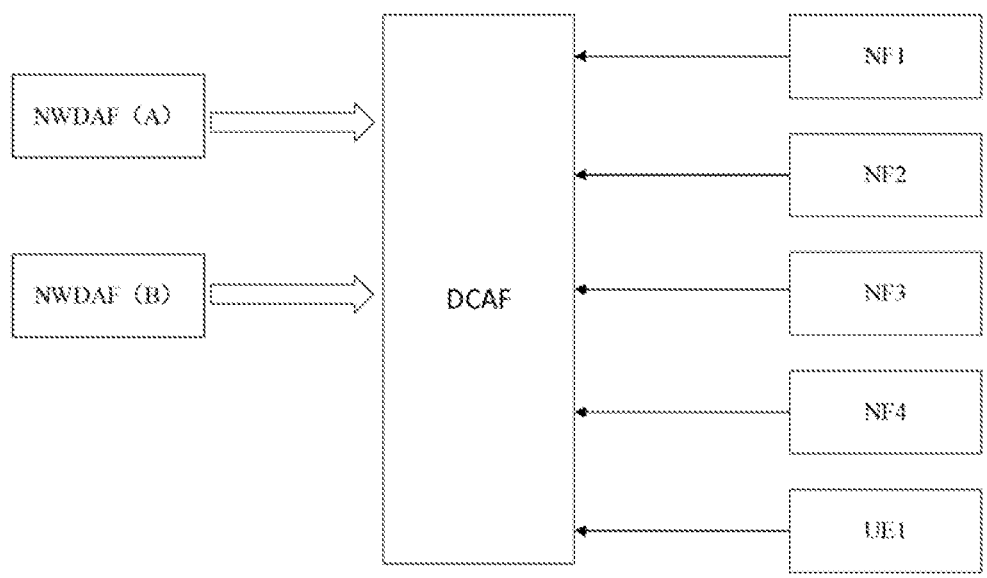
FIG. 2 is a schematic scenario diagram of a data collection method provided by an embodiment of the present application.

FIG. 2 is a schematic scenario diagram of a data collection method provided by an embodiment of the present application. As shown in FIG. 2, a data collection network element in a mobile network system is used to collect data from at least one data providing network element (e.g., NF or UE in FIG. 2) and provide the collected data to one or more data usage network elements. In a process of the data usage network element requesting data from the data collection network element, the data collection network element needs to perform authorization verification on the data usage network element. The authorization verification may include: verifying whether the data usage network element has the authority to obtain data, and/or, verifying whether the requested data can be provided to the data usage network element. The embodiments of the present application do not limit types of the data collection network element, the data usage network element, and the data providing network element. Illustratively, the data collection network element may be a data collection application function (DCAF) network element, the data usage network element may be an NWDAF, and the data providing network element may be one or more of a base station, a core network element, a terminal (e.g., UE1 in FIG. 2), and an application server.

In the present application, data providing network elements that provide data for the data collection network element may belong to one or more "data domains", and various data usage network elements may also belong to one or more data domains, and the data domains are isolated from each other. Therefore, in order to improve data security, whether data can be provided to a data usage network element may be determined by verifying whether the data usage network element and the data belong to a same domain. Specifically, the data collection network element may provide the data usage network element with data belonging to the same domain according to the request. If the data collection network element does not belong to the same domain as the requested data, the data collection network element does not provide the requested data to the data usage network element, or provides processed data to the data usage network element. The processed data may be, for example, privacy-removed data, simplified data, general statistical data, etc. A data domain may also correspond to a current concept (such as a data domain), or may be separately defined as a new concept, which is not limited herein.

Illustratively, due to the isolation of data domains, different "data domains" may be different data domains. As shown in FIG. 2, the data collection network element may collect data from multiple NFs, and the data usage network element is an NWDAF. NF1 and NF2 belong to a first domain, NF3 belongs to a second domain, NF4 and UE1 belong to a third domain, NWDAF(A) belongs to the first domain, and NWDAF(B) belongs to the second domain. Correspondingly. DCAF can provide NWDAF(A) with data of NF1 and NF2, and DCAF can provide NWDAF(B) with data of NF3, where the above-mentioned domains may be data domains. Specifically, an NWDAF may send a data obtaining request to DCAF to obtain data, the data obtaining request may include an identifier of the NWDAF (such as an NF id) and/or a data domain identifier (such as S-NSSAI) corresponding to the requested data, and the data domain may further include an identifier of the data domain to which the NWDAF itself belongs. The DCAF determines the data to be sent to the NWDAF in the following three manners. In a first manner, after receiving the data obtaining request, the DCAF may determine the data to be sent to the NWDAF according to the corresponding relationship between the NF id and the data domain. For example, according to the corresponding relationship between the NF id and the data domain, where the corresponding relationship between the NF id and the data domain may be pre-configured by an operation administration and maintenance (OAM) network element and stored in the DCAF. In a second manner, the DCAF may also send a query request to the network function network element, and receive indication information fed back by the network function network element, where the indication information is used to indicate the data to be sent to the NWDAF and/or the data domain to which the NWDAF belongs. In a third manner, the DCAF may directly determine the data to be sent to the NWDAF through an identifier of the data domain to which the NWDAF belongs sent by the NWDAF.

It should be noted that in the present application, the data collection network element may collect data from the data providing network element before the data usage network element requests data, or may collect data from the data providing network element after the data usage network element requests data, which is not limited herein. In addition, the data collection network element may also determine the data domain to which the data providing network element belongs when collecting data. The data collection network element may also classify and store the collected data according to the data domain. In addition, the manner of determining the data domain to which the data providing network element belongs may be similar to the manner of determining the data domain to which the data usage network element belongs, which will not be repeated herein.

In addition, the foregoing network element may refer to a server, which is not limited in the embodiments of the present application.

It should be noted that the application scenarios involved in the embodiments of the present application do not constitute limitations, and the data collection methods provided in the embodiments of the present application may also be applied to any other data obtaining scenarios.

The technical solutions of the embodiments of the present application will be described in detail below with specific embodiments using a data usage network element (such as the above NWDAF) and a data collection network element (such as the above DCAF, an access network device, a core network device, etc.). The following specific embodiments may be combined with each other, and the same or similar concepts or processes may not be repeated in some embodiments.

Figure 3:
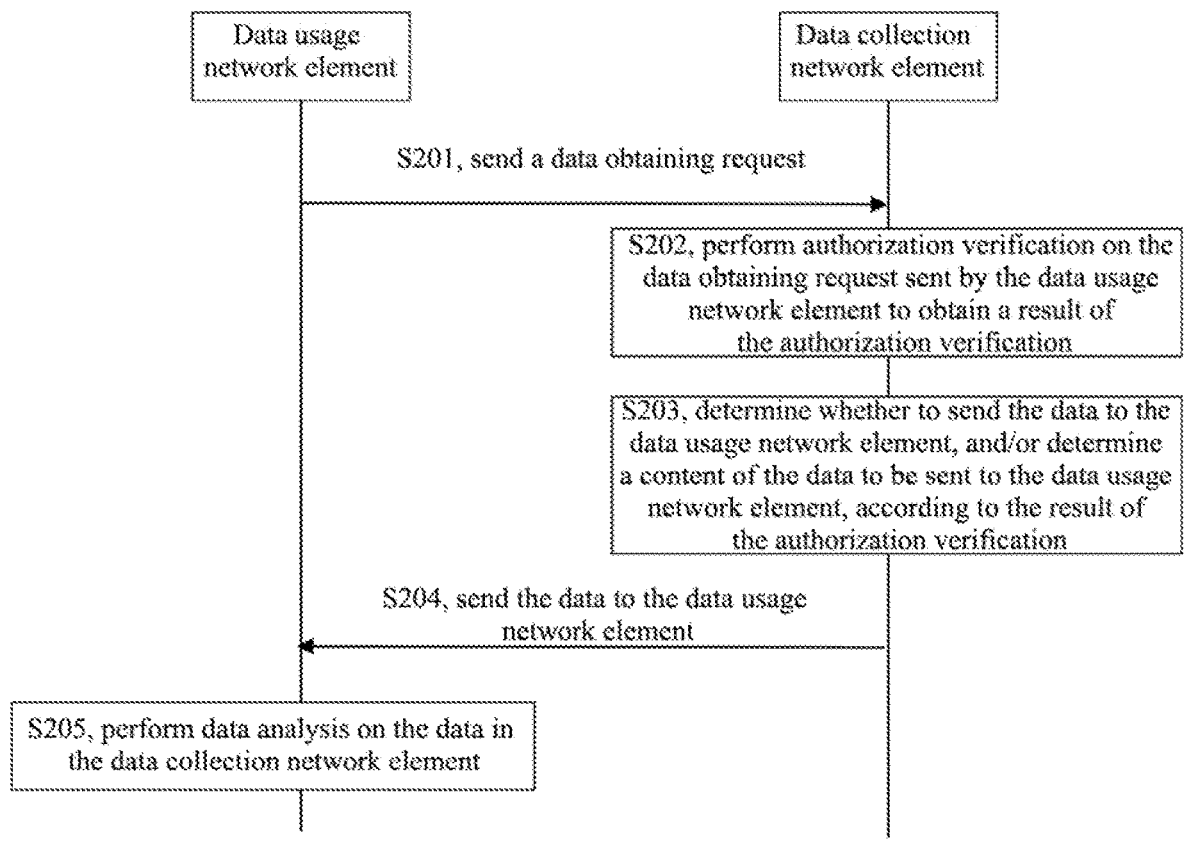
FIG. 3 is a schematic signaling diagram of a data collection method provided by an embodiment of the present application.

FIG. 3 is a schematic signaling diagram of a data collection method provided by an embodiment of the present application. The execution subjects of the embodiment of the present application are a data usage network element and a data collection network element, relating to a specific process of how the data usage network element obtaining data from the data collection network element. As shown in FIG. 3, the method includes:

S201, the data usage network element sends a data obtaining request to the data collection network element, where the data obtaining request is used to request the data collection network element to provide data to the data usage network element.

Illustratively, the data usage network element may be the above-mentioned NWDAF, and the data collection network element may be the above-mentioned data collection application function (DCAF) network element, an access network device, a core network device, etc., where the type of the data collection network element is not limited in the embodiments of the present application, and may be set according to an actual situation.

In this step, when the data usage network element wants to obtain data from the data collection network element, a data obtaining request may be sent to the data collection network element through an interface on the data collection network element, so as to obtain the data to be obtained.

In the present application, the data obtaining request may include indication information of the data to be obtained. In some embodiments, the data obtaining request further includes an identifier of a data domain to which the data requested by the data collection network element belongs.

In addition, in order to inform the data collection network element of the data usage network element which sends the data obtaining request and the data domain to which the data usage network element belongs, in some embodiments, the data obtaining request further includes an identifier of the data usage network element and/or an identifier of the data domain to which the data usage network element belongs.

S202, the data collection network element performs authorization verification on the data obtaining request sent by the data usage network element to obtain a result of the authorization verification.

In this step, after the data collection network element receives the data obtaining request sent by the data usage network element, the data collection network element may perform authorization verification on the data obtaining request sent by the data usage network element to obtain the result of the verification result.

Embodiments of the present application do not limit how to perform authorization verification, which may be specifically set according to an actual situation. In some embodiments, the data collection network element may first determine a data domain to which the data usage network element belongs, and then perform authorization verification on the data obtaining request sent by the data usage network element according to the data domain to which the data usage network element belongs to obtain the result of the authorization verification, where the data domain may be a network slice.

Embodiments of the present application do not limit how to determine the data domain to which the data usage network element belongs, and an appropriate manner may be selected according to an actual situation. The embodiments of the present application provide three optional manners to determine the data domain to which the data usage network element belongs, which are: directly informed by the data usage network element, determined by the data collection network element statically, and determined by the data collection network element and the network function network element dynamically.

Illustratively, when the data usage network element sends the data obtaining request to the data collection network element, the identifier of the data domain to which the data usage network element belongs may be carried in the data obtaining request. After the data collection network element receives the data obtaining request, the data domain to which the data usage network element belongs may be directly determined according to the identifier of the data domain to which the data usage network element belongs.

Illustratively, when the data usage network element sends the data obtaining request to the data collection network element, the identifier of the data usage network element may be carried in the data obtaining request. After the data collection network element receives the data obtaining request, the data domain to which the data usage network element belongs may be determined according to the identifier of the data usage network element and a corresponding relationship between the data usage network element and the data domain.

Illustratively, when the data usage network element sends the data obtaining request to the data collection network element, the identifier of the data usage network element may be carried in the data obtaining request. After receiving the data obtaining request, the data collection network element may send a data domain query request to a network function network element to query the data domain to which the data usage network element belongs, where the data domain query request includes the identifier of the data usage network element. Subsequently, the network function network element determines the data domain to which the data usage network element belongs according to the identifier of the data usage network element, and sends feedback information to the data collection network element, where the feedback information includes the identifier of the data domain to which the data usage network element belongs. Finally, the data collection network element determines the data domain to which the data usage network element belongs according to the identifier of the data domain to which the data usage network element belongs.

The network function network element may be a network element data repository function (NRF) network element, or a network slice selection function (NSSF) network element, etc.

In some embodiments, the network function network element may also send indication information to the data usage network element, where the indication information is used to directly indicate data of the data domain to be sent or data of the network element to be sent.

In a possible implementation, the data usage network element may also determine, based on static configuration or dynamic indication information, to request only the data of the data domain to which the data usage network element belongs from the data collection network element. In this possible implementation, the data collection network element may not need to perform a process of the authorization verification in step S202. It should be noted that the embodiments of the present application do not limit a type of the above-mentioned static configuration or dynamic indication information, which may be, for example, user subscription information, a policy rule, etc.

According to the static configuration or the indication information of other network elements (such as user subscription information, a policy rule, etc.), it is determined to request the data collection network element for only the data of the data domain to which the data usage network element belongs.

S203, the data collection network element determines whether to send the data to the data usage network element, and/or determines a content of the data to be sent to the data usage network element, according to the result of the authorization verification.

In this step, after the authorization verification is performed on the data obtaining request sent by the data usage network element and the result of the authorization verification is obtained, whether to send the data to the data usage network element, and/or a content of the data to be sent to the data usage network element, may be determined according to the result of the authorization verification.

In some embodiments, the data collection network element may first obtain the data of the data domain to which the data usage network element belongs from the data collection network element. Subsequently, the data collection network element may send the data of the data domain to which the data usage network element belongs to the data usage network element.

In some embodiments, the obtaining request may further indicate data to be obtained, or carry an identifier of the data domain to which data to be obtained belongs. At this time, if the data domain where the data requested by the data usage network element is located is the same as the data domain to which the data usage network element belongs, the data requested by the data usage network element is sent to the data usage network element. If the data domain where the data requested by the data usage network element is located is different from the data domain to which the data usage network element belongs, the data requested by the data usage network element is forbidden to be sent to the data usage network element, or, part of the data requested by the data usage network element is sent to the data usage network element.

The above-mentioned part of the data may be processed data, or data that does not contain private information.

In some other embodiments, the data collection network element includes source data and processed data corresponding to the source data; the source data is used for sending to a data usage network element consistent with a data domain of the source data, and the processed data is used for sending to a data usage network element inconsistent with the data domain of the source data.

Illustratively, the data collection network element may include two sets of data, the first set is source data, and the other set is processed data corresponding to the source data. Processing for the source data may include content merging, refinement, key information removal, and the like. At this time, the first set of information contains private information and may be sent to a data usage network element that is consistent with the data domain of the source data. The second set of information does not contain private information and may be sent to a data usage network element that is inconsistent with the data domain of the source data.

Corresponding to step S202, in a possible implementation, if the data usage network element determines, based on static configuration or dynamic indication information, to request the data collection network element for only the data of the data domain to which the data usage network element belongs, then accordingly, the data collection network element may not need to perform the process of determining whether to send data to the data usage network element and determining a content of the data to be sent to the data usage network element in step S203 accordingly.

Figure 4:
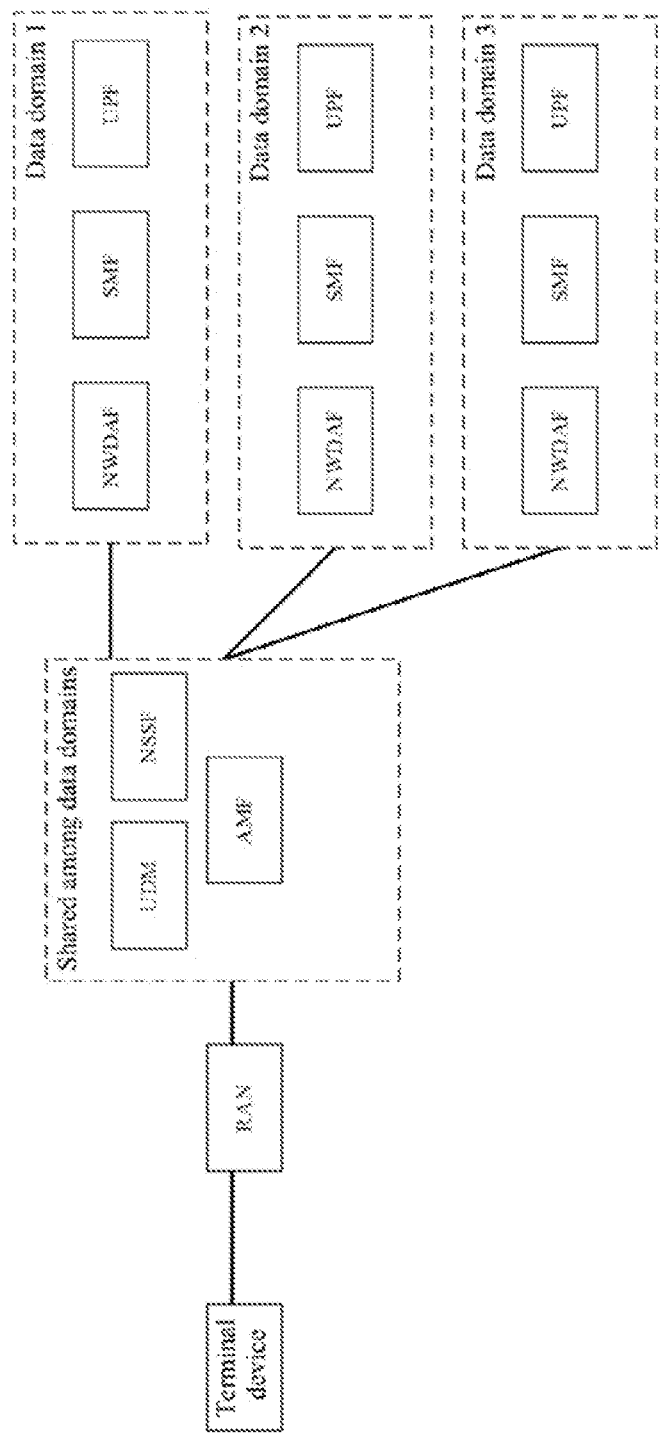
FIG. 4 is a schematic diagram of data domains provided by an embodiment of the present application.

FIG. 4 is a schematic diagram of data domains provided by an embodiment of the present application. As shown in FIG. 4, different data domains include at least one data usage network element (NWDAF), and also include at least one data collection network element (UPF, SMF, etc.). Network elements in different data domains interact with terminal devices through network elements (AMF, UDP, NSSF, etc.) shared among the data domains (also called a public data domain) and a radio access network (RAN). Due to the isolation of data domains, when a data usage network element obtains data, the data is provided to the data usage network element only when the data domain in which the data is located is the same as the data domain to which the data usage network element belongs. For data in other data domains, it is not open for the data usage network element, which greatly improves data security.

S204, the data collection network element sends the data to the data usage network element.

S205, the data usage network element performs data analysis on the data in the data collection network element.

In this step, after the data usage network element receives data in the data collection network element sent by the data collection network element, data analysis may be performed on the data in the data collection network element.

The embodiment of the present application do not limit how the data usage network element performs data analysis, and common data analysis manners may be adopted. Illustratively, the data usage network element may perform big data statistics, analysis or intelligent processing on the data in the data collection network element.

In the data collection method provided by the embodiments of the present application, the data collection network element receives a data obtaining request sent by the data usage network element, where the data obtaining request is used to request the data collection network element to provide data to the data usage network element. Subsequently, the data collection network element performs authorization verification on the data obtaining request sent by the data usage network element, and obtains a result of the authorization verification. Finally, the data collection network element determines whether to send the data to the data usage network element, and/or determines a content of the data to be sent to the data usage network element, according to the result of the authorization verification. Compared with the prior art, the authorization verification will be performed on the data obtaining request sent by the data usage network element when providing data, then it can be ensured that only an authorized data usage network element can obtain specific data, and thus data security can be improved.

Figure 5:
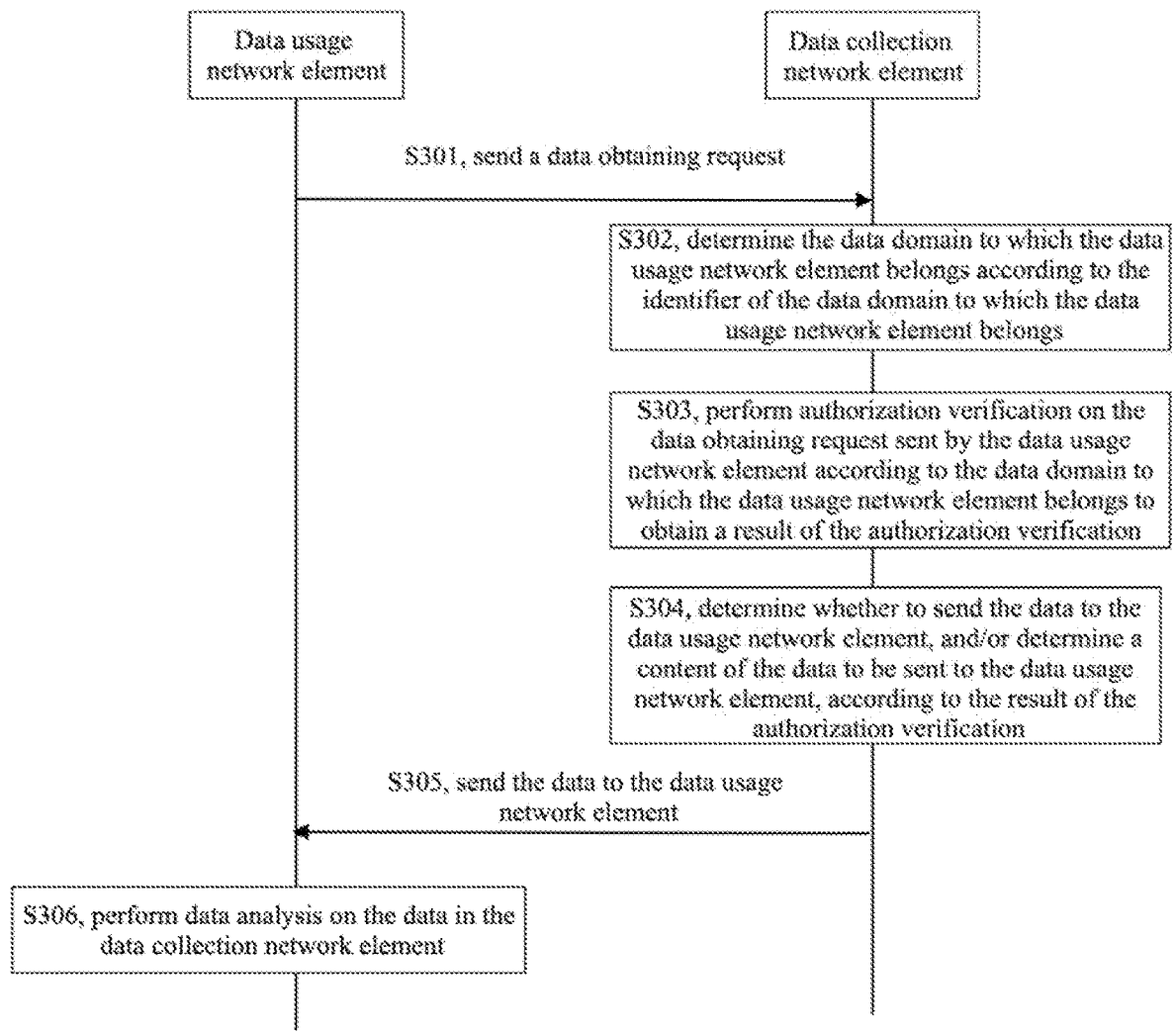
FIG. 5 is a schematic signaling diagram of another data collection method provided by an embodiment of the present application.

On the basis of the above embodiments, the following specifically describes the manner in which the data usage network element directly informs the data collection network element of the data domain to which the data usage network element belongs. FIG. 5 is a schematic signaling diagram of another data collection method provided by an embodiment of the present application. As shown in FIG. 5, the method includes:

S301, a data usage network element sends a data obtaining request to a data collection network element, where the data obtaining request is used to request the data collection network element to provide data to the data usage network element. The data obtaining request includes an identifier of a data domain to which the data usage network element belongs.

The technical terms, technical effects, technical features, and optional implementations of S301 can be understood with reference to S201 shown in FIG. 3, and the repeated content will not be repeated herein.

S302, the data collection network element determines the data domain to which the data usage network element belongs according to the identifier of the data domain to which the data usage network element belongs.

S303, the data collection network element performs authorization verification on the data obtaining request sent by the data usage network element according to the data domain to which the data usage network element belongs to obtain a result of the authorization verification.

S304, the data collection network element determines whether to send the data to the data usage network element, and/or determines a content of the data to be sent to the data usage network element, according to the result of the authorization verification.

S305, the data collection network element sends the data to the data usage network element.

S306, the data usage network element performs data analysis on the data in the data collection network element.

In the embodiment of the present application, the data usage network element directly sends the identifier of the data domain to the data collection network element, so that the data collection network element can quickly determine the data domain to which the data usage network element belongs, so as to avoid sending the data usage network element data that does not belong to the data domain to which the data usage network element belongs, thereby improving data security.

Figure 6:
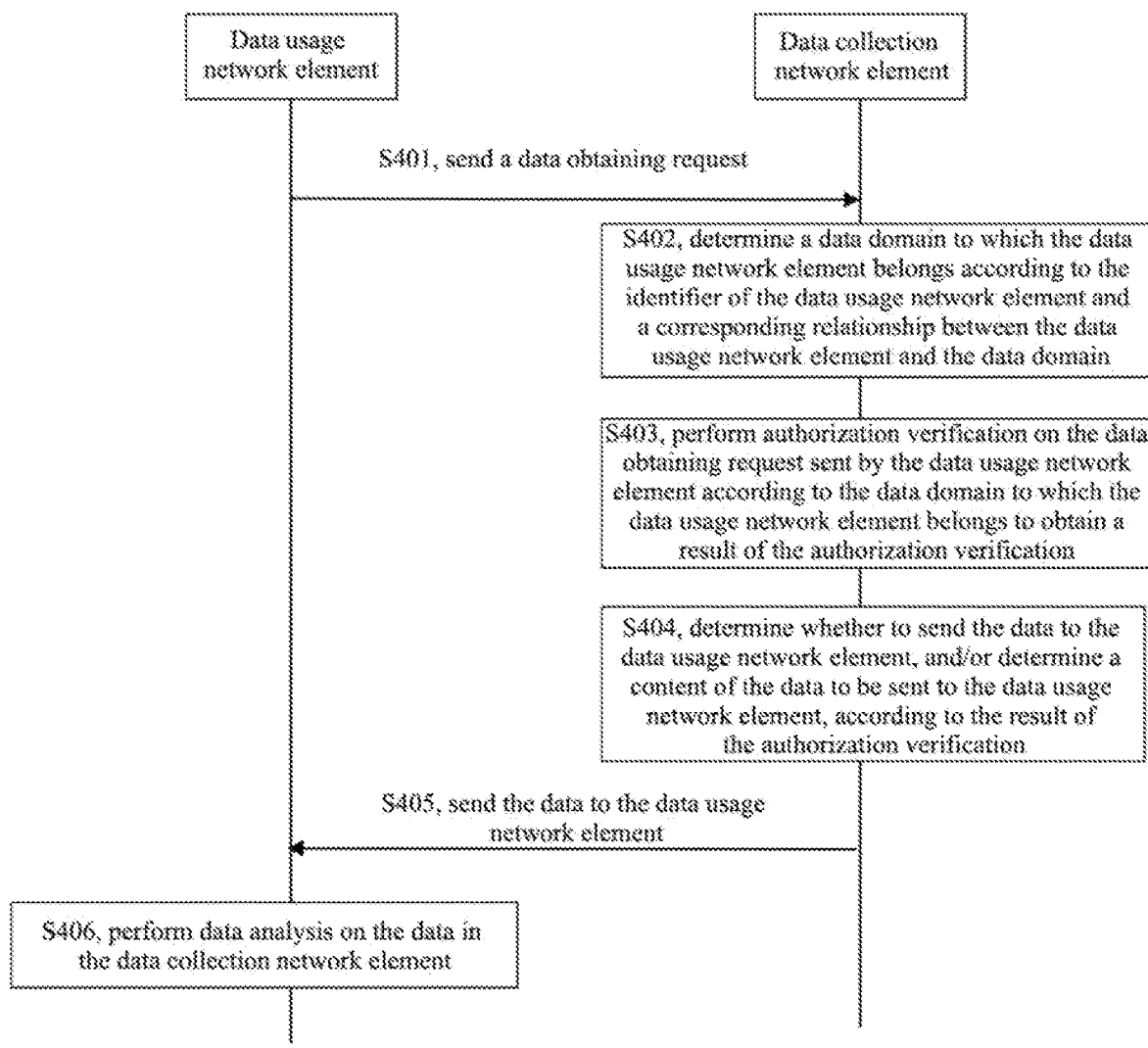
FIG. 6 is a schematic signaling diagram of still another data collection method provided by an embodiment of the present application.

The following specifically describes the manner in which the data collection network element statically determines the data domain to which the data usage network element belongs. FIG. 6 is a schematic signaling diagram of still another data collection method provided by an embodiment of the present application. As shown in FIG. 6, the method includes:

S401, a data usage network element sends a data obtaining request to a data collection network element, where the data obtaining request is used to request the data collection network element to provide data to the data usage network element. The data obtaining request includes an identifier of the data usage network element.

The technical terms, technical effects, technical features, and optional implementations of S401 can be understood with reference to S201 shown in FIG. 3, and the repeated content will not be repeated herein.

S402, the data collection network element determines a data domain to which the data usage network element belongs according to the identifier of the data usage network element and a corresponding relationship between the data usage network element and the data domain.

In this step, after the data collection network element obtains the identifier of the data usage network element in the data obtaining request, the data domain to which the data usage network element belongs can be determined according to the identifier of the data usage network element and the corresponding relationship between the data usage network element and the data domain.

The corresponding relationship between the data usage network element and the data domain may be preset in the data collection network element, or may be provided by another network element to the data collection network element, which is not limited in the embodiments of the present application.

In some embodiments, a data domain may have a corresponding relationship with one or more data usage network elements, and the data collection network element may find a data domain that has a corresponding relationship with the data usage network element based on the identifier of the data usage network element, so as to determine the data domain to which the data usage network element belongs.

S403, the data collection network element performs authorization verification on the data obtaining request sent by the data usage network element according to the data domain to which the data usage network element belongs to obtain a result of the authorization verification.

S404, the data collection network element determines whether to send the data to the data usage network element, and/or determines a content of the data to be sent to the data usage network element, according to the result of the authorization verification.

S405, the data collection network element sends the data to the data usage network element.

S406, the data usage network element performs data analysis on the data in the data collection network element.

The technical terms, technical effects, technical features, and optional implementations of S403-S406 can be understood with reference to S202-S205 shown in FIG. 3, and the repeated content will not be repeated herein.

In the embodiments of the present application, the data usage network element determines the data domain to which the data usage network element belongs according to the identifier of the data usage network element and the corresponding relationship between the data usage network element and the data domain, so that it can be avoided that data not belonging to the data domain to which the data usage network element belongs is sent to the data usage network element, thereby improving the data security.

Figure 7:
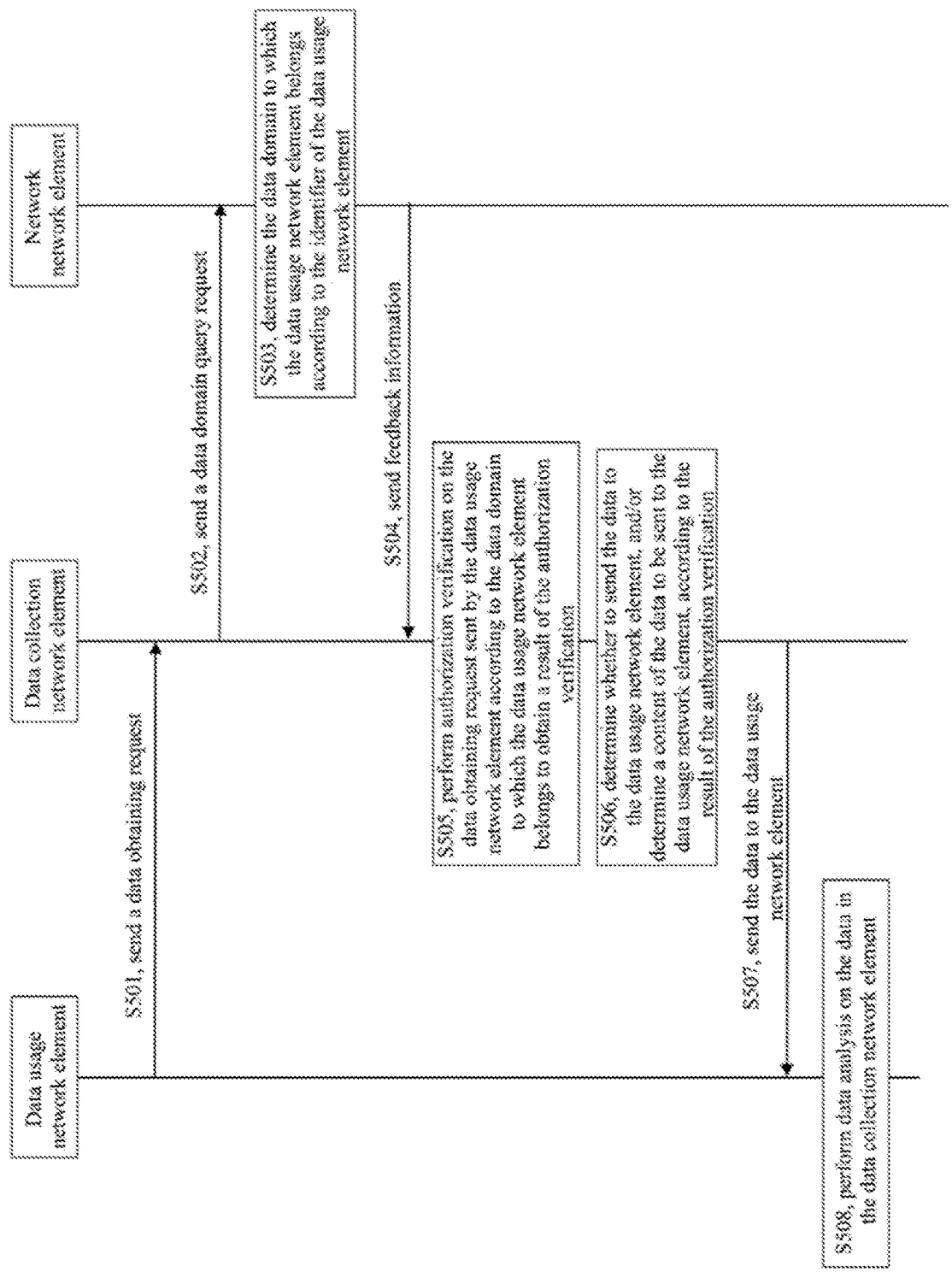
FIG. 7 is a schematic signaling diagram of yet another data collection method provided by an embodiment of the present application.

The following will specifically describe the manner in which the data collection network element and the network function network element dynamically determine the data domain to which the data usage network element belongs. FIG. 7 is a schematic signaling diagram of yet another data collection method provided by an embodiment of the present application. As shown in FIG. 7, the method includes:

S501, a data usage network element sends a data obtaining request to a data collection network element, where the data obtaining request is used to request the data collection network element to provide data to the data usage network element. The data obtaining request includes an identifier of the data usage network element.

The technical terms, technical effects, technical features, and optional implementations of S501 can be understood with reference to S201 shown in FIG. 3, and the repeated content will not be repeated herein.

S502, the data collection network element sends a data domain query request to a network function network element, where the data domain query request is used to query a data domain to which the data usage network element belongs, and the query request includes the identifier of the data usage network element.

In some embodiments, the network function network element may be a data domain query server. The embodiments of the present application do not limit a type of the network function network element, which may be a network element data repository function (NRF) network element or a network slice selection function (NSSF) network element, or an operation administration and maintenance (OAM) network element, etc.

S503, the network function network element determines the data domain to which the data usage network element belongs according to the identifier of the data usage network element.

In this step, after receiving the query request sent by the data collection network element, the network function network element can obtain the identifier of the data usage network element from the query request, and determine the data domain to which the data usage network element belongs according to the identifier of the data usage network element.

The embodiments of the present application do not limit how the network function network element determines the data domain to which the data usage network element belongs. A manner of querying the corresponding relationship between the data usage network element and the data domain may also be adopted, and the information of the data usage network element may also be queried in real time.

S504, the network function network element sends feedback information to the data collection network element, where the feedback information includes an identifier of the data domain to which the data usage network element belongs.

In some embodiments, if the network function network element fails to successfully query the data domain to which the data usage network element belongs, feedback information sent to the data collection network element may include an indication that the query fails.

S505, the data collection network element performs authorization verification on the data obtaining request sent by the data usage network element according to the data domain to which the data usage network element belongs to obtain a result of the authorization verification.

S506, the data collection network element determines whether to send the data to the data usage network element, and/or determines a content of the data to be sent to the data usage network element, according to the result of the authorization verification.

S507, the data collection network element sends the data to the data usage network element.

S508, the data usage network element performs data analysis on the data in the data collection network element.

The technical terms, technical effects, technical features, and optional implementations of S505-S508 can be understood with reference to S202-S205 shown in FIG. 3, and the repeated content will not be repeated herein.

In the embodiments of the present application, the data collection network element sends the data domain query request to the network function network element to query the data domain to which the data usage network element belongs, so that when the data domain to which the data usage network element belongs changes, the data collection network element can learn in time. It is avoided that data not belonging to the data domain to which the data usage network element belongs is sent to the data usage network element, thereby improving data security.

On the basis of the above-mentioned embodiments, how to send data to the data usage network element based on the result of authorization verification in the embodiments of the present application will be described below.

In a first situation, if the data obtaining request does not indicate data to be obtained, the data collection network element may send all data of the data domain to which the data usage network element belongs to the data usage network element.

In a second situation, if the data obtaining request indicates data to be obtained, or carries an identifier of a data domain to which the data to be obtained belongs, then, the data collection network element may compare the data domain to which the data to be obtained belongs with the data domain to which the data usage network element belongs, so as to determine how to send data to the data usage network element.

Figure 8:
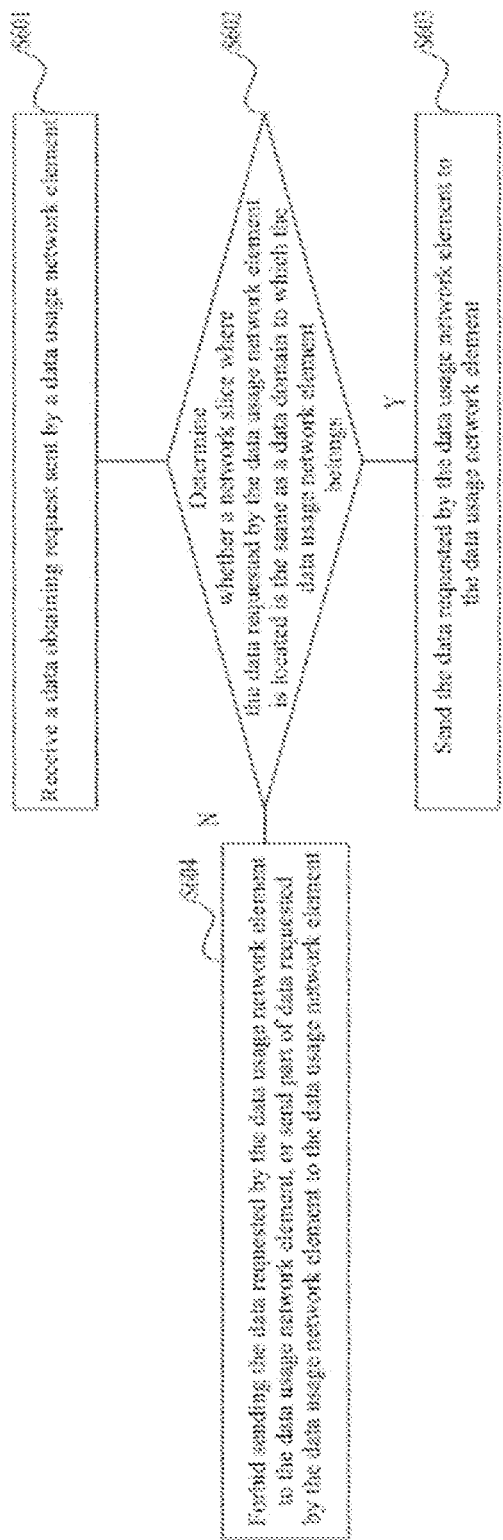
FIG. 8 is a schematic flow diagram of a data collection method provided by an embodiment of the present application.

The second situation will be specifically described below. FIG. 8 is a flow schematic diagram of a data collection method provided by an embodiment of the present application. The execution subject of the present embodiment is a data collection network element. As shown in FIG. 8, the method includes:

S601, receive a data obtaining request sent by a data usage network element, where the data obtaining request is used to request the data collection network element to provide data to the data usage network element.

The technical terms, technical effects, technical features, and optional implementations of S601 can be understood with reference to S301 shown in FIG. 3, and the repeated content will not be repeated herein.

S602, determine whether a data domain where the data requested by the data usage network element is located is the same as a data domain to which the data usage network element belongs.

If yes, step S603 is executed, and if not, step S604 is executed.

S603, send the data requested by the data usage network element to the data usage network element.

S604, forbid sending the data requested by the data usage network element to the data usage network element, or send pan of the data requested by the data usage network element to the data usage network element.

The embodiments of the present application do not limit how to send the part of the data. In some embodiments, the part of the data may be processed data, or data that does not contain private information.

In a third situation, the data collection network element may include two sets of data, the first set is source data, and the other set is processed data corresponding to the source data. Processing for the source data may include content merging, refinement, key information removal, and the like. At this time, the first set of information contains private information and can be sent to a data usage network element that is consistent with the data domain of the source data. The second set of information does not contain private information and can be sent to a data usage network element that is inconsistent with the data domain of the source data.

In the data collection methods provided by the embodiments of the present application, the data collection network element receives the data obtaining request sent by the data usage network element, and the data obtaining request is used to request to obtain data in the data collection network element. Subsequently, the data collection network element sends data in the data collection network element to the data usage network element according to the data domain to which the data usage network element belongs, and the data is related to the data domain. Compared with the prior art, since the data domain to which the data usage network element belongs is considered when the data is provided, thus, the data security can be improved.

In the prior art, a data usage network element can only interact with other network side network elements and obtain required data, and a terminal device cannot send data to the data usage network element, and thus the data usage network element does not have the capability to collect terminal data for data analysis. In order to solve the above problem, an embodiment of the present application provides a data collection method, in which a data collection network element receives terminal data sent by an application network element, and then sends the terminal data to the data usage network element, so that the data usage network element has the capability to collect the terminal data for data analysis.

Figure 9:
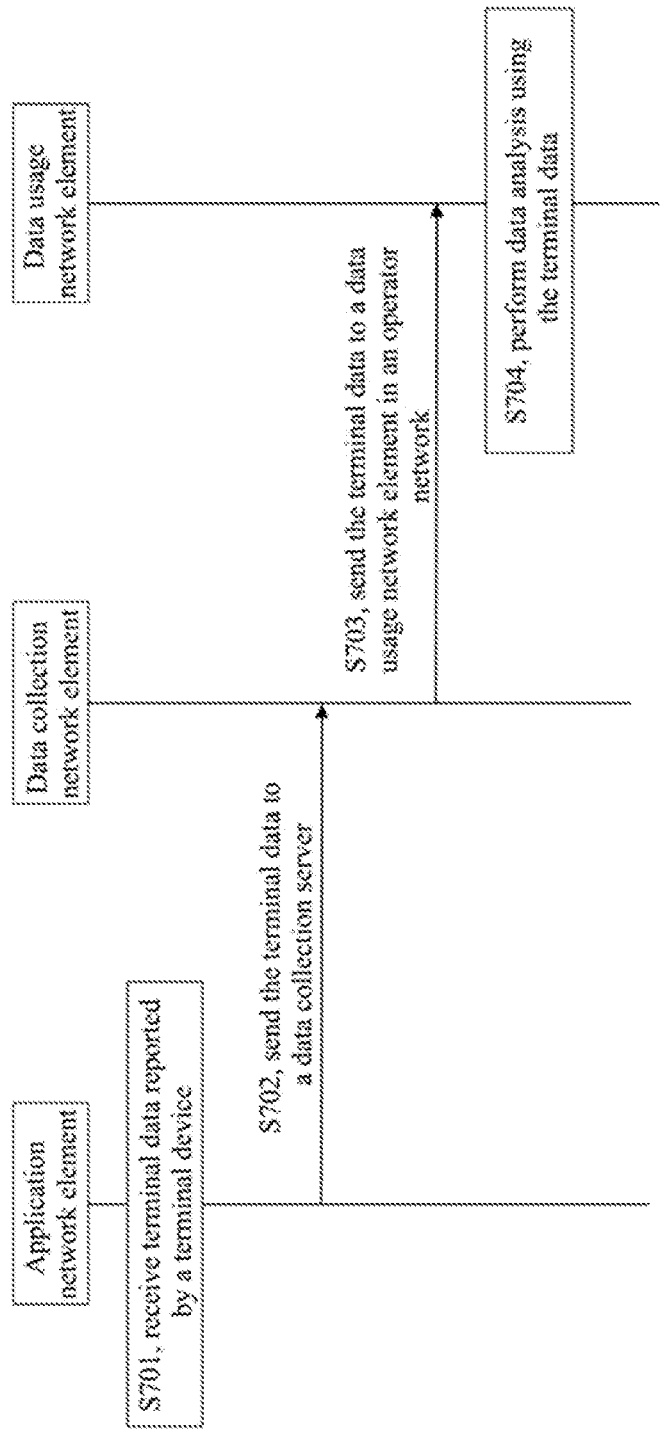
FIG. 9 is a schematic signaling diagram of yet another data collection method provided by an embodiment of the present application.
Figure 10:
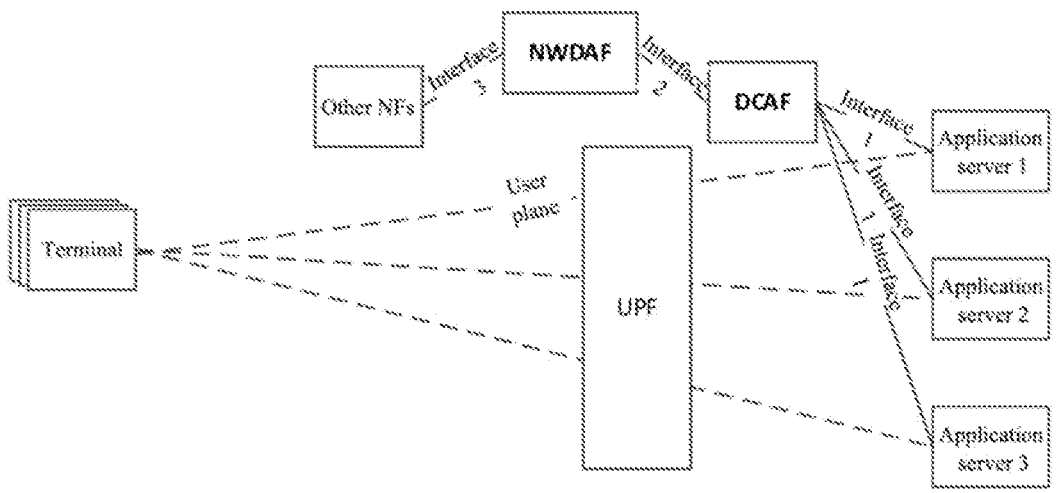
FIG. 10 is a schematic diagram of reporting terminal data provided by an embodiment of the present application.

FIG. 9 is a schematic signaling diagram of yet another data collection method provided by an embodiment of the present application. FIG. 10 is a schematic diagram of reporting terminal data provided by an embodiment of the present application. FIG. 9 and FIG. 10 relate to a process of how a data usage network element obtains terminal data. As shown in FIG. 9 and FIG. 10, the method includes:

S701, an application network element receives terminal data reported by a terminal device.

S702, at least one application network element sends the terminal data to a data collection network element.

The application network element may be called an application server, and the embodiments of the present application do not limit a type of the application network element, which may be any third-party application network element.

The data collection network element may be the above-mentioned DCAF, and the DCAF is used to collect data in the application network element and process the data. In some embodiments, the data collection network element may be managed by an operator.

In addition, the above-mentioned terminal data may be application-related terminal data, or may be data of the terminal device itself, which is not limited in the embodiments of the present application. In some embodiments, different application network elements correspond to different applications, each application network element collects terminal data related to an application from one or more terminal devices, and sends the terminal data to the data collection network element.

In an embodiment of the present application, a data obtaining request may be sent to the application network element by the data collection network element to obtain terminal data, or a data sending request may be sent to the data collection network element by the application network element to request the data collection network element to obtain terminal data, which is not limited in the present application.

Illustratively, before receiving the terminal data sent by the at least one application network element, the data collection network element may send a data obtaining request to the at least one application network element, where the data obtaining request is used to request to obtain the terminal data in the at least one application network element, where the application network element is provided with an application programming interface (API), and the data collection network element may send the data obtaining request through the API of the application network element.

Illustratively, before the data collection network element receives the terminal data sent by at least one application network element, the data collection network element may receive a data sending request sent by the application network element, where the data sending request is used to request to send the terminal data in the application network element to the data collection network element. Subsequently, the data collection network element may send a data sending instruction to the application network element, where the data collection network element is also provided with an API, and the data collection network element may receive the data sending request sent by the application network element through the API of the data collection network element.

In addition, in some embodiments, before receiving the terminal data sent by at least one application network element, the data collection network element may further establish a network connection between the data collection network element and the application network element through the API of the data collection network element and the API of the application network element. Specifically, the data collection network element may establish a user plane network connection between the data collection network element and the application network element through a control plane connection between the API of the data collection network element and the API of the application network element.

It should be noted that, in order to protect user privacy, after receiving the terminal data sent by at least one application network element, the terminal data may also be processed. The processing may be privacy processing for removing private information in the data.

A manner of the processing includes at least one of the following: collecting statistics about the terminal data reported by multiple terminal devices, determining an average of the terminal data reported by multiple terminal devices, removing a terminal device identifier in the terminal data, replacing a terminal device identifier in the terminal data, performing scrambling processing on the terminal data, and extracting and summarizing data from the corresponding terminal data reported by the multiple terminal devices.

The scrambling processing may include adding white noise, and the general trend of the scrambled data remains unchanged, but a specific value thereof may change. The summarized data only retains some features of the original data, or the summarized data has less detail than the original data, and will not reveal too much detail or unimportant content.

In order to complete the above processing, the data collection network element may also receive one or more parameters of the application network element. Illustratively, the data collection network element receives an indication parameter sent by the application network element, where the indication parameter is used to indicate a processing manner. Illustratively, the data collection network element may receive an identifier (e.g., APP id) of the application corresponding to the terminal data sent by the application network element, which indicates the application corresponding to the application network element. Illustratively, the data collection network element may receive a number of terminals corresponding to the terminal data sent by the application network element, so as to process the terminal data according to the number of terminals. Illustratively, the data collection network element may receive a batch sending identifier corresponding to the terminal data sent by the application network element, and the batch sending identifier is used to replace terminal device identifiers in the terminal data, so that the terminals corresponding to the terminal data cannot be learned later, thereby protecting the user privacy.

S703, the data collection network element sends the terminal data to a data usage network element in an operator network.

In some embodiments, after receiving the terminal data sent by at least one application network element, the data collection network element may send the terminal data to the data usage network element in the operator network.

The embodiments of the present application do not limit how to send the terminal data to the data usage network element, and an appropriate manner may be adopted according to an actual situation.

S704, the data usage network element performs data analysis using terminal data.

The embodiments of the present application do not limit how the data usage network element performs data analysis, and common data analysis manners may be adopted. Illustratively, the data usage network element may perform big data statistics, analysis or intelligent processing on the data in the data collection network element.

In the data collection methods provided by the embodiments of the present application, the application network element receives the terminal data reported by the terminal device. Then, the application network element sends the terminal data to the data collection network element. Further, the data collection network element sends the terminal data to the data usage network element in the operator network. Finally, the data usage network element performs data analysis using the processed terminal data. Compared with the prior art, the data collection methods provided by the embodiments of the present application can enable the data usage network element to obtain the terminal data, so that the data usage network element has the capability to collect terminal data for data analysis.

Those of ordinary skill in the art can understand that all or part of the steps of implementing the above method embodiments can be completed by hardware related to program information, the aforementioned program can be stored in a computer readable storage medium, and when the program is executed, the steps containing the above method embodiments are executed; and the aforementioned storage medium includes various media that can store program code, such as a ROM, a RAM, a magnetic disk or an optical disk.

Figure 11:
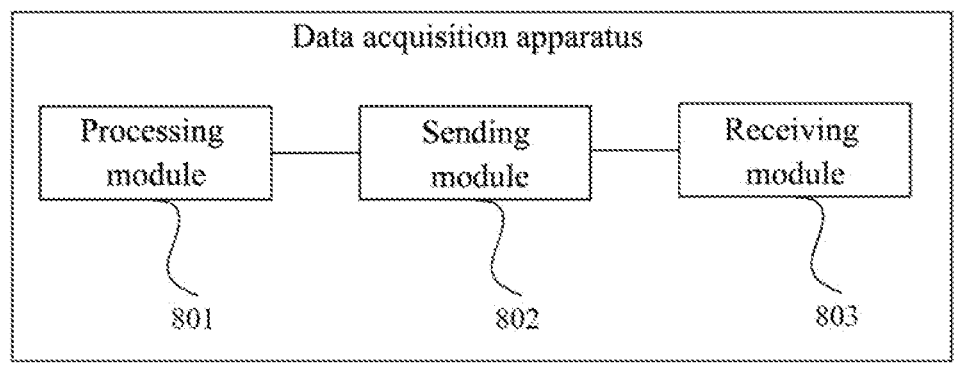
FIG. 11 is a schematic structural diagram of a data collection network element provided by an embodiment of the present application.

FIG. 11 is a schematic structural diagram of a data collection network element provided by an embodiment of the present application. The data collection network element may be implemented by software, hardware, or a combination of the two, so as to execute the data collection method on the data collection network element side in the above embodiments. As shown in FIG. 11, the data collection network element includes: a processing module 801, a sending module 802 and a receiving module 803.

The receiving module 803 is configured to receive a data obtaining request sent by a data usage network element, where the data obtaining request is used to request the data collection network element to provide data to the data usage network element; the processing module is configured to perform authorization verification on the data obtaining request sent by the data usage network element to obtain a result of the authorization verification; and the sending module 802 is configured to determine whether to send the data to the data usage network element, and/or, determining a content of the data to be sent to the data usage network element, according to the result of the authorization verification.

In an optional implementation, the processing module 801 is specifically configured to perform authorization verification on the data obtaining request sent by the data usage network element according to a data domain to which the data usage network element belongs to obtain the result of the authorization verification.

In an optional implementation, the data obtaining request includes an identifier of the data usage network element and/or an identifier of the data domain to which the data usage network element belongs.

In an optional implementation, the processing module 801 is further configured to determine the data domain to which the data usage network element belongs according to the identifier of the data usage network element and a corresponding relationship between the data usage network element and the data domain.

In an optional implementation, the processing module 801 is further configured to send a query request to a network function network element, where the query request is used to query the data domain to which the data usage network element belongs, and the query request includes the identifier of the data usage network element; and receive feedback information sent by the network function network element, where the feedback information includes the identifier of the data domain to which the data usage network element belongs.

In an optional implementation, the processing module 801 is further configured to determine the data domain to which the data usage network element belongs according to the identifier of the data domain to which the data usage network element belongs.

In an optional implementation, the sending module 802 is specifically configured to obtain data of the data domain to which the data usage network element belongs from the data collection network element; and send the data of the data domain to which the data usage network element belongs to the data usage network element.

In an optional implementation, the sending module 802 is specifically configured to send the data requested by the data usage network element to the data usage network element if a data domain where the data requested by the data usage network element is located is the same as a data domain to which the data usage network element belongs.

In an optional implementation, the sending module 802 is specifically configured to forbid sending the data requested by the data usage network element to the data usage network element, or, sending part of the data requested by the data usage network element to the data usage network element if a data domain where the data requested by the data usage network element is located is different from a data domain to which the data usage network element belongs.

In an optional implementation, the data collection network element includes source data and processed data corresponding to the source data; the source data is used for sending to a data usage network element consistent with a data domain of the source data, and the processed data is used for sending to the data usage network element inconsistent with the data domain of the source data.

In an optional implementation, the data domain is a network slice.

The data collection network element provided in the embodiments of the present application can perform actions of the data collection method on the data collection network element side in the foregoing embodiments, and its implementation principle and technical effect are similar, which will not be repeated herein.

Figure 12:
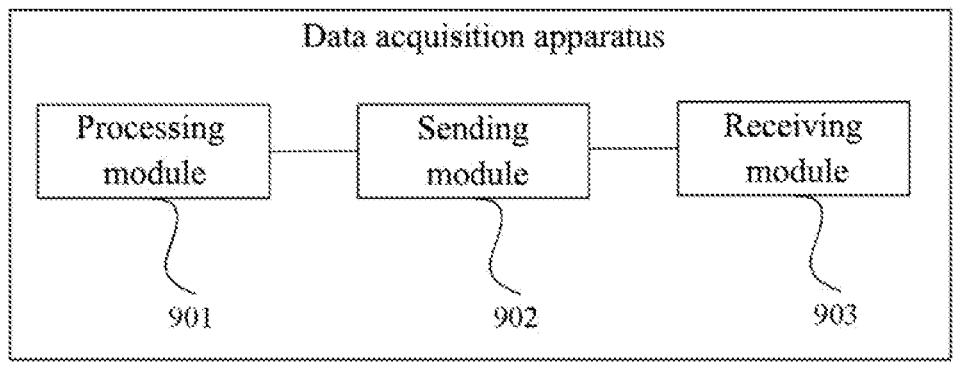
FIG. 12 is a schematic structural diagram of another data usage network element provided by an embodiment of the present application.

FIG. 12 is a schematic structural diagram of another data usage network element provided by an embodiment of the present application. The data usage network element may be implemented by software, hardware, or a combination of the two, so as to execute the data method on the data usage network element side in the above embodiments. As shown in FIG. 12, the data usage network element includes: a processing module 901, a sending module 902 and a receiving module 903.

The sending module 902 is configured to send a data obtaining request to a data collection network element, where the data obtaining request is used to request the data collection network element to provide data to the data usage network element; the receiving module 903 is configured to receive data in the data collection network element sent by the data collection network element, where the data in the data collection network element is related to authorization verification of the data usage network element; and the processing module 901 is configured to perform data analysis using the data in the data collection network element.

In an optional implementation, the data obtaining request further includes an identifier of a data domain to which the data requested to be obtained belongs.

In an optional implementation, the authorization verification is related to the data domain to which the data collection network element belongs.

In an optional implementation, the data obtaining request includes an identifier of the data usage network element and/or an identifier of the data domain to which the data usage network element belongs.

In an optional implementation, the data domain is a network slice.

The data usage network element provided in the embodiment of the present application can perform actions of the data collection method on the data usage network element side in the foregoing embodiments, and its implementation principle and technical effect are similar, which will not be repeated herein.

Figure 13:
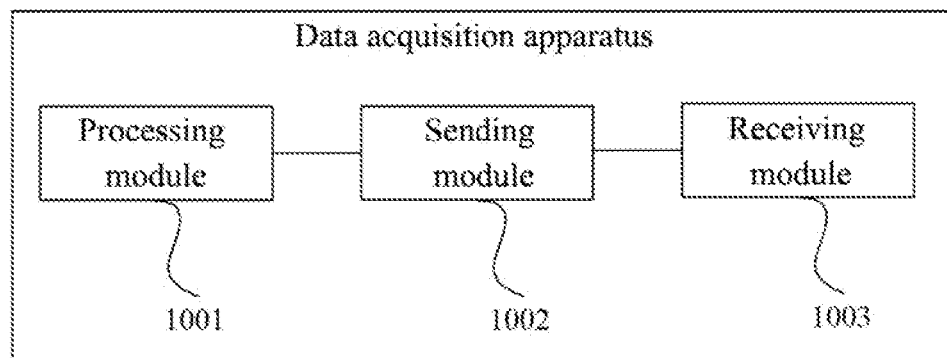
FIG. 13 is a schematic structural diagram of still another network function network element provided by an embodiment of the present application.

FIG. 13 is a schematic structural diagram of still another network function network element provided by an embodiment of the present application. The network function network element may be implemented by software, hardware, or a combination of the two, so as to execute the data collection method on the network function network element side in the above embodiments. As shown in FIG. 13, the network function network element includes: a processing module 1001, a sending module 1002 and a receiving module 1003.

The receiving module 1003 is configured to receive a data domain query request sent by a data collection network element, where the data domain query request includes an identifier of a data usage network element; the processing module 1001 is configured to determine a data domain to which the data usage network element belongs according to the identifier of the data usage network element; and the sending module 1002 is configured to send feedback information to the data collection network element, where the feedback information includes an identifier of the data domain to which the data usage network element belongs.

In an optional implementation, the data domain is a network slice.

The network function network element provided in the embodiment of the present application can perform actions of the data collection method on the network function network element side in the foregoing embodiments, and its implementation principle and technical effect are similar, which will not be repeated herein.

Figure 14:
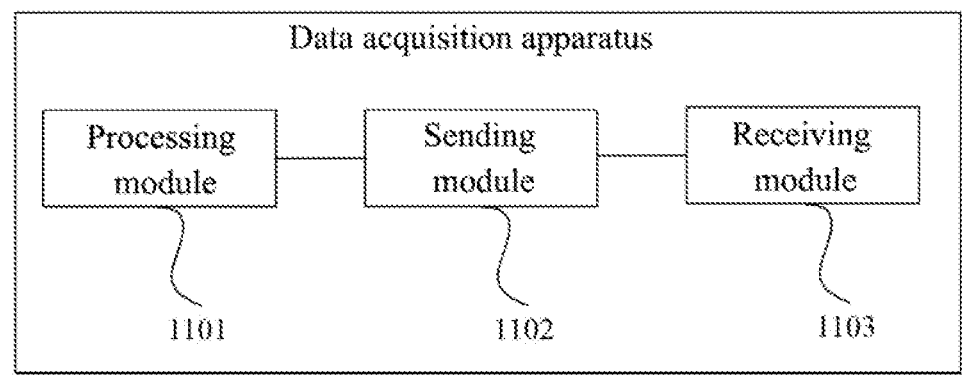
FIG. 14 is a schematic structural diagram of yet another data collection network element provided by an embodiment of the present application.

FIG. 14 is a schematic structural diagram of yet another data collection network element provided by an embodiment of the present application. The data collection network element may be implemented by software, hardware, or a combination of the two, so as to execute the data collection method on the data collection network element side in the above embodiments. As shown in FIG. 14, the data collection network element includes: a processing module 1101, a sending module 1102 and a receiving module 1103.

The receiving module 1103 is configured to receive terminal data sent by at least one application network element, where the terminal data is reported to the at least one application network element by a terminal device; and the sending module 1102 is configured to send the terminal data to a data usage network element in an operator network.

In an optional implementation, the data collection network element further includes: a processing module 1101, configured to process the terminal data.

In an optional implementation, a manner of the processing includes at least one of the following: collecting statistics about the terminal data reported by multiple terminal devices, determining an average of the terminal data reported by multiple terminal devices, removing a terminal device identifier in the terminal data, replacing a terminal device identifier in the terminal data, performing scrambling processing on the terminal data, or extracting and summarizing data from the corresponding terminal data reported by multiple terminal devices.

In an optional implementation, the sending module 1102 is further configured to send a data obtaining request to the at least one application network element, where the data obtaining request is used to request to obtain the terminal data in the at least one application network element.

In an optional implementation, the sending module 1102 is specifically configured to send the data obtaining request to the application network element through an application program interface API of the application network element.

In an optional implementation, the receiving module 1103 is further configured to receive a data sending request sent by the application network element, where the data sending request is used to request to send the terminal data in the application network element to the data collection network element; and the sending module 1102 is further configured to send a data sending instruction to the application network element.

In an optional implementation, the receiving module 1103 is specifically configured to receive the data sending request sent by the application network element through an API of the data collection network element.

In an optional implementation, the processing module 1101 is further configured to establish a network connection between the data collection network element and the application network element through an API of the data collection network element and an API of the application network element.

In an optional implementation, the processing module 1101 is specifically configured to establish a user plane network connection between the data collection network element and the application network element through a control plane connection between the API of the data collection network element and the API of the application network element.

In an optional implementation, the receiving module 1103 is further configured to receive an indication parameter sent by the application network element, where the indication parameter is used to indicate a manner of the processing.

In an optional implementation, the receiving module 1103 is further configured to receive an identifier of an application corresponding to the terminal data sent by the application network element.

In an optional implementation, the receiving module 1103 is further configured to receive a number of terminals corresponding to the terminal data sent by the application network element.

In an optional implementation, the receiving module 1103 is further configured to receive a batch sending identifier corresponding to the terminal data sent by the application network element, where the batch sending identifier is used to replace a terminal device identifier in the terminal data.

The data collection network element provided in the embodiment of the present application can perform actions of the data method on the data collection network element side in the foregoing embodiments, and its implementation principle and technical effect are similar, which will not be repeated herein.

Figure 15:
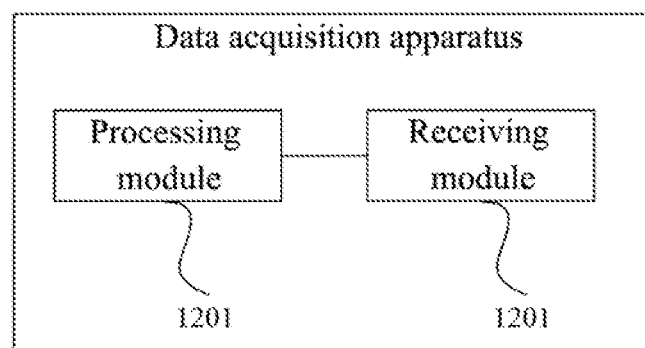
FIG. 15 is a schematic structural diagram of yet another data usage network element provided by an embodiment of the present application.

FIG. 15 is a schematic structural diagram of yet another data usage network element provided by an embodiment of the present application. The data usage network element may be implemented by software, hardware, or a combination of the two, so as to execute the data method on the data usage network element side in the above embodiments. As shown in FIG. 15, the data usage network element includes: a processing module 1201 and a receiving module 1202.

The receiving module 1202 is configured to receive terminal data sent by a data collection network element; and the processing module 1201 is configured to perform data analysis using the terminal data.

The data usage network element provided in the embodiment of the present application can perform actions of the data collection method on the data usage network element side in the foregoing embodiments, and its implementation principle and technical effect are similar, which will not be repeated herein.

Figure 16:
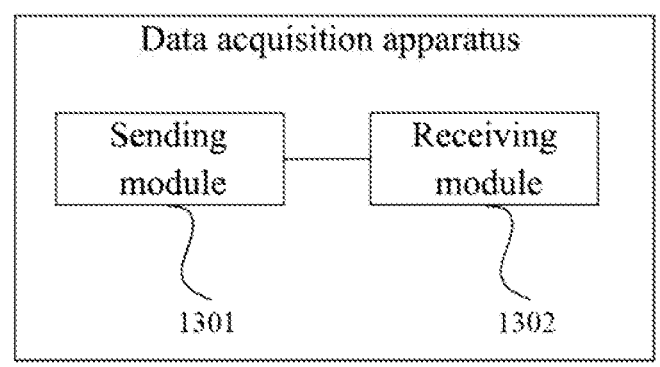
FIG. 16 is a schematic structural diagram of yet another application network element provided by an embodiment of the present application.

FIG. 16 is a schematic structural diagram of yet another data application network element provided by an embodiment of the present application. The data application network element may be implemented by software, hardware, or a combination of the two, so as to execute the data method on the application network element side in the above embodiments. As shown in FIG. 16, the data application network element includes: a sending module 1301 and a receiving module 1302.

The receiving module 1302 is configured to receive terminal data reported by a terminal device; and the sending module 1301 is configured to send the terminal data to a data collection network element.

The data application network element provided in the embodiment of the present application can perform actions of the data collection method on the application network element side in the foregoing embodiments, and its implementation principle and technical effect are similar, which will not be repeated herein.

Figure 17:
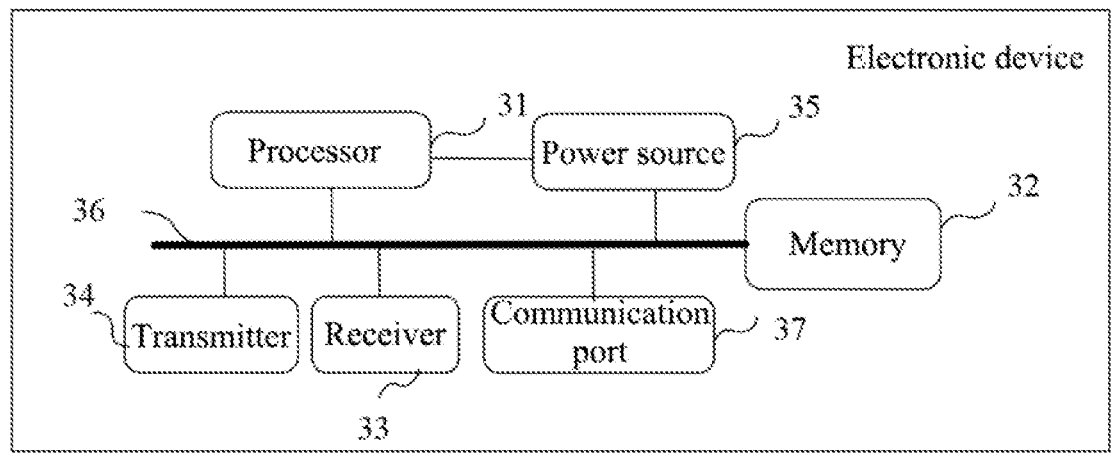
FIG. 17 is a schematic structural diagram of an electronic device provided by an embodiment of the present application.

FIG. 17 is a schematic structural diagram of an electronic device provided by an embodiment of the present application. As shown in FIG. 17, the electronic device may include: a processor 31 (e.g., a CPU), a memory 32, a receiver 33 and a transmitter 34; the receiver 33 and the transmitter 34 are coupled to the processor 31, the processor 31 controls receiving actions of the receiver 33, and the processor 31 controls sending actions of the transmitter 34. The memory 32 may include a high-speed RAM memory, and may also include a non-volatile memory (NVM), such as at least one magnetic-disc memory, and various information may be stored in the memory 32 for completing various processing functions and implementing the method steps of the embodiments of the present application. In an embodiment, the electronic device involved in the embodiment of the present application may further include: a power source 35, a communication bus 36 and a communication port 33. The receiver 33 and the transmitter 34 may be integrated in the transceiver of the electronic device, or may be independent transceiving antennas on the electronic device. The communication bus 36 is used to realize communication connections between the elements. The above-mentioned communication port 37 is used to realize connection and communication between the electronic device and other peripheral devices.

In the embodiment of the present application, the above-mentioned memory 32 is used to store computer-executable program code, and the program code includes information; when the processor 31 executes the information, the information causes the processor 31 to execute processing actions of the above method embodiments, causes the transmitter 34 to execute sending actions of the foregoing method embodiments, and causes the receiver 33 to execute receiving actions of the foregoing method embodiments. The implementation principles and technical effects thereof are similar, and are not repeated herein.

An embodiment of the present application further provides a chip, including a processor and an interface, where the interface is configured to input and output data or instructions processed by the processor and the processor is configured to execute the methods provided in the above method embodiments.

The present disclosure further provides a computer readable storage medium, the computer readable storage medium may include: a U disk, a mobile hard disk, a read-only memory (ROM), a random access memory (RAM), a magnetic disk or an optical disk and other media that can store program code. Specifically, the computer readable storage medium stores program information, and the program information is used for the above methods.

An embodiment of the present application further provides a program, which is used to execute the methods provided by the above method embodiments when executed by the processor.

An embodiment of the present application further provide a program product, such as a computer readable storage medium, where the program product has instructions stored therein, which, when running on a computer, cause the computer to execute the methods provided by the above method embodiments.

The above-mentioned embodiments may be implemented in whole or in part by software, hardware, firmware or any combination thereof, and when implemented in software, may be implemented in whole or in part in the form of a computer program product. A computer program product includes one or more computer instructions. When the computer program instructions are loaded and executed on a computer, the procedures or functions according to embodiments of the present disclosure are generated in whole or in part. The computer may be a general purpose computer, a special purpose computer, a computer network, or other programmable apparatus. Computer instructions may be stored on a computer readable storage medium or transmitted from one computer readable storage medium to another computer readable storage medium, for example, the computer instructions may be transmitted from a website site, a computer, a server, or a data center via a wired (such as coaxial cable, optical fiber, digital subscriber line (DSL)) or wireless (such as infrared, wireless, microwave, etc.) manner to another website site, computer, server or data center for transmission. The computer readable storage medium may be any available medium that can be accessed by a computer, or a data storage device such as a server, a data center, or the like that includes an integration of one or more available media. The available medium may be a magnetic medium (e.g., a floppy disk, a hard disk, a magnetic tape), an optical medium (e.g., a DVD), or a semiconductor medium (e.g., a solid state disk (SSD)), or the like.

Finally, it should be noted that the above embodiments are only used to illustrate the technical solutions of the present disclosure, but not to limit them; although the present disclosure has been described in detail with reference to the foregoing embodiments, those of ordinary skill in the art should understand that: the technical solutions described in the foregoing embodiments can still be modified, or some or all of the technical features thereof can be equivalently replaced; and these modifications or replacements do not make the essence of the corresponding technical solutions deviate from the scope of the technical solutions of the embodiments of the present disclosure.

What is claimed is:

1. A data collection method applied to a data collection network element, the method comprising:
receiving a data obtaining request sent by a data usage network element, wherein the data obtaining request comprises an identifier of the data usage network element and/or a data domain identifier corresponding to requested data;
receiving terminal data sent by at least one application network element, wherein the terminal data is reported to the at least one application network element by a terminal device;
processing the terminal data,
determining data to be sent to the data usage network element according to a corresponding relationship between the identifier of the data usage network element and a data domain; and
sending the processed terminal data to the data usage network element in an operator network;

wherein the data collection network element and the data usage network element belong to different data domains;

wherein the data usage network element is a core network element, and the data usage network element is a network data analysis function (NWDAF) network element;

wherein the application network element comprises an application server;

wherein the data collection network element is a data collection application function (DCAF).

2. The method according to claim 1, wherein processing the terminal data comprises at least one of the following:

determining an average of the terminal data reported by multiple terminal devices, or extracting and summarizing data from the corresponding terminal data reported by multiple terminal devices.

3. The method according to claim 2, wherein the method further comprises:

receiving an identifier of an application corresponding to the terminal data sent by the application network element; or receiving a number of terminals corresponding to the terminal data sent by the application network element; or receiving a batch sending identifier corresponding to the terminal data sent by the application network element, wherein the batch sending identifier is used to replace a terminal device identifier in the terminal data.

4. The method according to claim 1, wherein before the receiving the terminal data sent by the at least one application network element, the method further comprises:

sending a data obtaining request to the at least one application network element, wherein the data obtaining request is used to request to obtain the terminal data in the at least one application network element;

wherein the sending the data obtaining request to the at least one application network element comprises:

sending the data obtaining request to the application network element through an application program interface (API) of the application network element.

5. The method according to claim 1, wherein before the receiving the terminal data sent by the at least one application network element, the method further comprises:

receiving a data sending request sent by the application network element, wherein the data sending request is used to request to send the terminal data in the application network element to the data collection network element; and sending a data sending instruction to the application network element;

wherein the receiving the data sending request sent by the application network element comprises:

receiving the data sending request sent by the application network element through an application program interface (API) of the data collection network element.

6. The method according to claim 1, wherein before the receiving the terminal data sent by the at least one application network element, the method further comprises:

establishing a network connection between the data collection network element and the application network element through an application program interface (API) of the data collection network element and an API of the application network element;

wherein the establishing the network connection between the data collection network element and the application network element comprises:

establishing a user plane network connection between the data collection network element and the application network element through a control plane connection between the API of the data collection network element and the API of the application network element.

7. The method according to claim 1, wherein the method further comprises:

receiving an indication parameter sent by the application network element, wherein the indication parameter is used to indicate a manner of the processing.

8. The method according to claim 1, wherein the processed terminal data comprises at least one of the following:

privacy-removed data, simplified data, general statistical data.

9. The method according to claim 1, wherein the identifier of the data usage network element is an network function identification (NF id), and the data domain identifier corresponding to requested data is a single-network slice selection assistance information (S-NSSAI), and the data domain further comprise an identifier of the data domain to which the data usage network element itself belongs.

10. A data usage network element, wherein the data usage network element comprises:

at least one processor; and a memory communicatively connected with the at least one processor, wherein the memory stores instructions executable by the at least one processor, and the instructions, when executed by be at least one processor, cause the at least one processor to:

send a data obtaining request to a data collection network element, wherein the data obtaining request comprises an identifier of the data usage network element and/or a data domain identifier corresponding to requested data;

receive terminal data processed by the data collection network element and sent by the data collection network element, wherein the terminal data is determined by the data collection network element according to a corresponding relationship between the identifier of the data usage network element and a data domain; and perform data analysis using the terminal data;

wherein the data collection network element and the data usage network element belong to different data domains;

wherein the data usage network element is a core network element, and the data usage network element is a network data analysis function (NWDAF) network element;

wherein the data collection network element is a data collection application function (DCAF).

11. A data collection network element, wherein the data collection network element comprises:

at least one processor; and a memory communicatively connected with the at least one processor;

wherein, the memory stores instructions executable by the at least one processor, and the instructions, when executed by be at least one processor, cause the at least one processor to:

receive a data obtaining request sent by a data usage network element, wherein the data obtaining request comprises an identifier of the data usage network element and/or a data domain identifier corresponding to requested data;

receive terminal data sent by at least one application network element, wherein the terminal data is reported to the at least one application network element by a terminal device;
process the terminal data,
determine data to be sent to the data usage network element according to a corresponding relationship between the identifier of the data usage network element and a data domain; and
send the processed terminal data to the data usage network element in an operator network;
wherein the data collection network element and the data usage network element belong to different data domains;
wherein the data usage network element is a core network element, and the data usage network element is a network data analysis function (NWDAF) network element;
wherein the application network element comprises an application server;
wherein the data collection network element is a data collection application function (DCAF).

12. The data collection network element according to claim 11, wherein process the terminal data comprises at least one of the following:
determine an average of the terminal data reported by multiple terminal devices, or
extract and summarize data from the corresponding terminal data reported by the multiple terminal devices.

13. The data collection network element according to claim 11, further comprising a sending module configured to send a data obtaining request to the at least one application network element, wherein the data obtaining request is used to request to obtain the terminal data in the at least one application network element;
wherein the data obtaining request is sent to the application network element through an application program interface (API) of the application network element.

* * * * *